(12) United States Patent
Brown et al.

(10) Patent No.: US 12,248,595 B2
(45) Date of Patent: Mar. 11, 2025

(54) NETWORK INTRUSION EVENT RESPONSE AND PROTECTION

(71) Applicant: Snowflake Inc., Bozeman, MT (US)

(72) Inventors: Marion A. Brown, Spring, TX (US); Keith M. Hoyle, Montgomery, TX (US)

(73) Assignee: Snowflake Inc., Bozeman, MT (US)

( * ) Notice: Subject to any disclaimer, the term of this patent is extended or adjusted under 35 U.S.C. 154(b) by 218 days.

(21) Appl. No.: 18/306,799

(22) Filed: Apr. 25, 2023

(65) Prior Publication Data
US 2024/0362351 A1 Oct. 31, 2024

(51) Int. Cl.
*G06F 21/62* (2013.01)
*G06F 16/182* (2019.01)
*H04L 9/08* (2006.01)
*H04L 9/40* (2022.01)

(52) U.S. Cl.
CPC ........ *G06F 21/6218* (2013.01); *G06F 16/184* (2019.01); *H04L 9/0816* (2013.01); *H04L 63/1416* (2013.01); *G06F 2221/2107* (2013.01)

(58) Field of Classification Search
CPC .............. G06F 21/6218; G06F 16/184; G06F 2221/2107; H04L 9/0816; H04L 9/0894; H04L 63/1416
See application file for complete search history.

(56) References Cited

U.S. PATENT DOCUMENTS

| | | | | |
|---|---|---|---|---|
| 11,314,875 B1 * | 4/2022 | Acharya | ................ | G06F 21/602 |
| 11,494,411 B1 * | 11/2022 | Gernhardt | ............. | G06F 16/275 |
| 11,630,845 B2 * | 4/2023 | Dageville | ............. | G06F 16/273 |
| | | | | 707/615 |
| 11,748,374 B2 * | 9/2023 | Gernhardt | ........... | G06F 11/2097 |
| | | | | 707/610 |
| 12,135,734 B2 * | 11/2024 | Chu | ...................... | G06F 16/213 |

* cited by examiner

*Primary Examiner* — Han Yang
(74) *Attorney, Agent, or Firm* — Schwegman Lundberg & Woessner, P.A.

(57) ABSTRACT

Provided herein are systems and methods for network intrusion event response and remediation. A file encryption key is generated based on a first private key of a user and a root key associated with a primary deployment of a database system. File data is encoded at a source account of the user using the file encryption key. The file data is replicated from the source account into a target account of the user to generate replicated file data. Notification of a detected network intrusion event is encoded for transmission to the user. A failover of the source account to the target account is performed based on the notification. The failover grants the user access to the replicated file data based at least on a second private key of the user.

30 Claims, 24 Drawing Sheets

NETWORK INTRUSION EVENT RESPONSE AND PROTECTION

TECHNICAL FIELD

Embodiments of the disclosure relate generally to communication security in a database system and, more specifically, to near real-time network intrusion event response and protection in the database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. However, database systems can be subject to network intrusion events such as communication security breaches and cyber-attacks (e.g., malware attacks such as network attacks using ransomware).

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
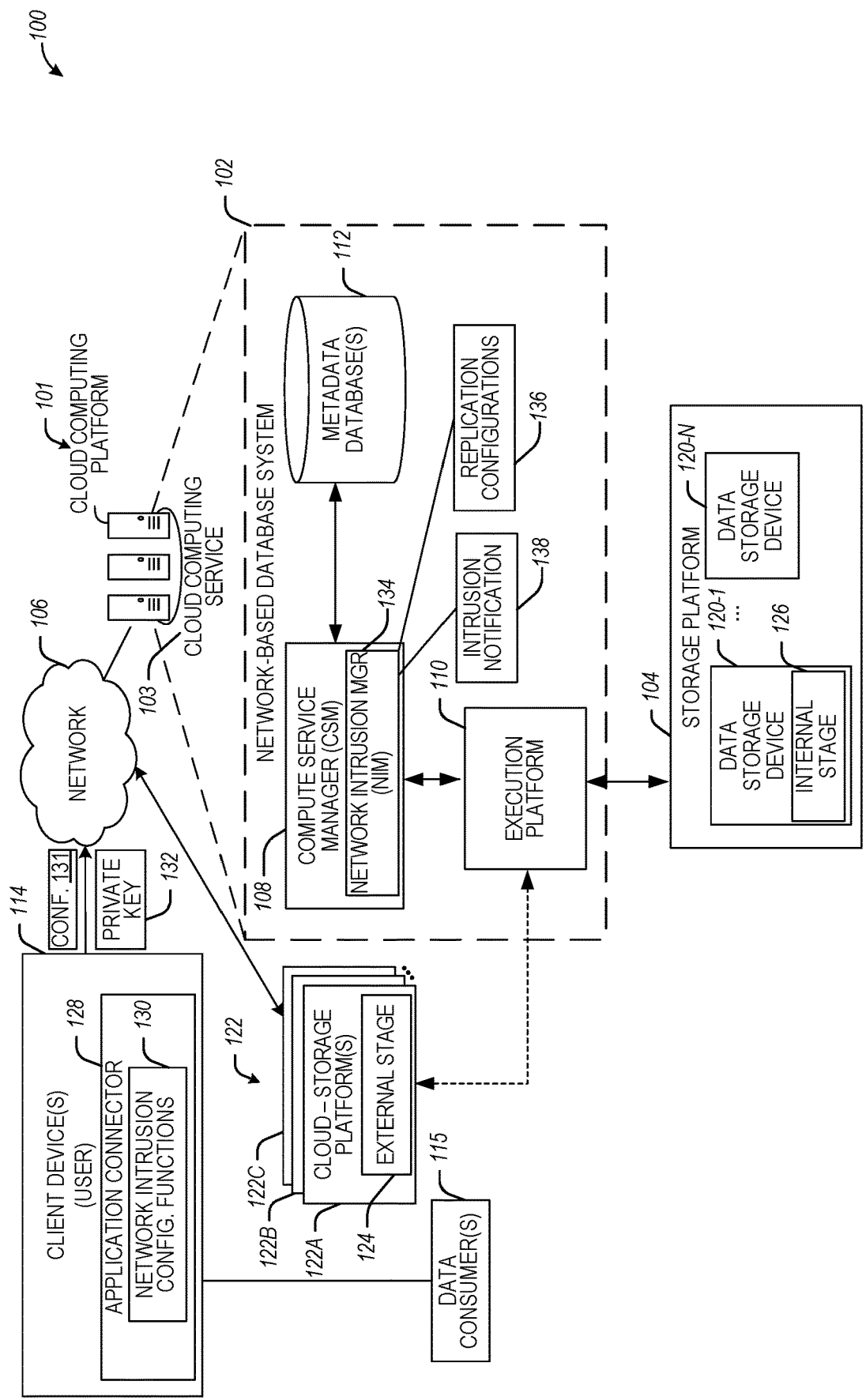
FIG. 1 illustrates an example computing environment that includes a network-based database system that is in communication with a cloud storage platform and is using a network intrusion manager (NIM), in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in user accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a user account. The data platform may include one or more databases that are respectively maintained in association with any number of user accounts (e.g., accounts of one or more data providers or other types of users), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular user accounts as well. Users and/or executing processes that are associated with a given user account may, via one or more types of clients, be able to cause data to be ingested into the database, and may also be able to manipulate the data, add additional data, remove data, run queries against the data, generate views of the data, and so forth.

In an implementation of a data platform, a given database (e.g., a database maintained for a user account) may reside as an object within, e.g., a user account, which may also include one or more other objects (e.g., users, roles, privileges, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

Aspects of the present disclosure provide techniques for detection and response to network intrusion events including cyber attacks (e.g., malware or ransomware attacks) and other network disaster events. More specifically, the disclosed techniques can be used to configure an account replication of a user source account to a target account and to monitor the source account for a network intrusion event. The data files of the user source account can be encrypted based on a private key of the user (e.g., a key that can be configured, stored, read, or deleted only by the user) and a root key associated with a primary deployment of a network-based database system. After a network intrusion event is detected at the source account, a notification is generated for the user, causing the deletion of the private key of the user. The deletion of the private key results in locking down the source account in near real-time. The target account can be designated as a primary account to complete the failover process. An additional instruction can be generated to cause the deletion of the compromised source account. In this regard, the disclosed techniques can be used to protect users of the network-based database system from network intrusion events, such as ransomware attacks, providing minimal user downtime for accessing the user data.

The various embodiments that are described herein are described with reference where appropriate to one or more of the various figures. An example computing environment with a NIM configured to perform the disclosed techniques are discussed in connection with FIGS. 1-3. Example multi-deployment arrangements using replication configurations are discussed in connection with FIG. 4 and FIG. 5. Additional database system arrangements using replication configurations for failover and sharing used in connection with network intrusion event detection are discussed in connection with FIG. 6-FIG. 11. Example secure key configurations used in connection with the disclosed techniques are discussed in connection with FIG. 12 and FIG. 13. Example functionalities associated with network intrusion event detection and response are discussed in connection with FIG. 14-FIG. 23. A more detailed discussion of example computing devices that may be used with the disclosed techniques is provided in connection with FIG. 24.

FIG. 1 illustrates an example computing environment 100 including a network-based database system 102 which is in communication with a cloud storage platform and is using a network intrusion manager (NIM), in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., configuring and performing network intrusion event detection and response as described herein). The cloud computing platform 101 may include a three-tier architecture: data storage (e.g., storage platform 104 and storage platforms 122), an execution platform 110 (e.g., providing query processing), and a compute service manager 108 providing cloud services including services associated with the disclosed functionalities.

It is often the case that organizations that are users of a given data platform also maintain data storage (e.g., a data lake) that is external to the data platform (i.e., one or more external storage locations). For example, a company could be a user of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The user's servers and cloud-storage platforms are both examples of what a given user could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given user stores at a given external storage location may or may not be stored in an external stage in the external storage location—i.e., in some data-platform implementations, it is a user's choice whether to create one or more external stages (e.g., one or more external-stage objects) in the user's data-platform account as an organizational and functional construct for conveniently interacting via the data platform with one or more external files.

As shown, the network-based database system 102 of the cloud computing platform 101 is in communication with the storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as a user device) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network. In some embodiments, the user of the client device 114 can be a data provider configured to provide services to other users such as data consumers 115.

In the description below, actions are ascribed to users of the network-based database system. Such actions shall be understood to be performed concerning client device 114 (or multiple client devices) operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user of the network-based database system shall be understood to include performing such actions by the cloud computing service 103 in response to an instruction from that user.

In some embodiments, the client device 114 is configured with an application connector 128, which can perform network intrusion configuration functions 130. For example, client device 114 can be associated with a user of the network-based database system 102 (e.g., a data provider or another type of user) using the cloud computing service 103 of the network-based database system 102. In some embodiments, network intrusion configuration functions 130 include generating configurations 131 which can be used to configure replication functions performed by the compute service manager 108. For example, the network intrusion manager (NIM) 134 uses configurations 131 to generate replication configurations (RC) 136 used for performing account replication of one or more accounts of the user in connection with network intrusion event detection and response functions disclosed herein.

In some aspects, network intrusion configuration functions 130 include generating a private key 132, which is a unique cryptographic key that is configured and managed only by the user (e.g., using client device 114). The private key 132 can be stored in an external stage of the user (e.g., external stage 124 or another storage of the user). In some aspects, the private key 132 is used in connection with network intrusion event detection and response functions disclosed herein (e.g., as discussed in connection with FIG. 13-FIG. 19.

The compute service manager 108 is also coupled to one or more metadata databases 112 that store metadata about various functions and aspects associated with the network-based database system 102 and its users. For example, the one or more metadata databases 112 may include a summary of data stored in remote data storage systems as well as data available from a local cache. Additionally, the one or more metadata databases 112 may include information regarding how data is organized in remote data storage systems (e.g., the storage platform 104) and the local caches. Information stored by the one or more metadata databases 112 allows systems and services to determine whether a piece of data needs to be accessed without loading or accessing the actual data from a storage device. In some embodiments, the one or more metadata databases 112 is configured to store account object metadata (e.g., account objects used in connection with a replication group object).

Figure 3:
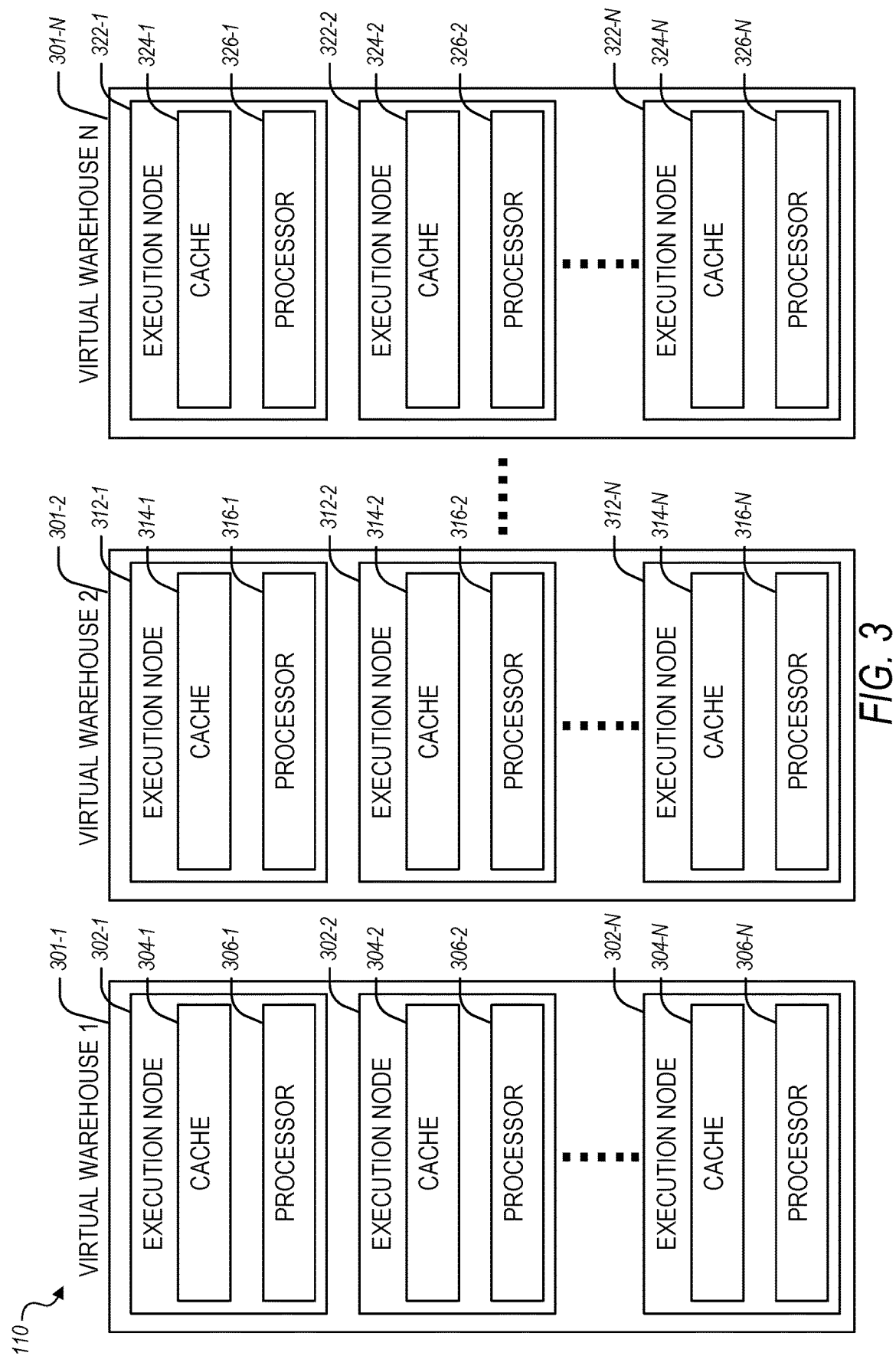
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122A, 122B, . . . , 122C (collectively referred to as storage platforms 122). The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the storage platform 104 may include distributed file systems (such as Hadoop Distributed File Systems (HDFS)), object storage systems, and the like. In some embodiments, at least one internal stage 126 may reside on one or more of the data storage devices 120-1-120-N, and the external stage 124 may reside on one or more of the storage platforms 122.

In some embodiments, the compute service manager 108 includes a network intrusion manager (NIM) 134. The NIM 134 comprises suitable circuitry, interfaces, logic, and/or code and is configured to perform the disclosed functionalities associated with detection and response to network intrusion events including cyber-attacks (e.g., malware or ransomware attacks) and other network disaster events. More specifically, NIM 134 uses RC 136 to perform account replication of a user source account to a target account and to monitor the source account for a network intrusion event. NIM 134 can encrypt the data files of the user source account based on the private key 132 of the user (e.g., a key that can be configured, stored, read, or deleted only by the user) and a root key associated with a primary deployment of the network-based database system 102.

After NIM 134 detects a network intrusion event at the source account of the user, an intrusion notification 138 is generated for the user, causing the deletion of the private key of the user. For example, intrusion notification 138 can include an instruction for the user to delete the private key 132 so that access to data files of the user encrypted using the private key can be rendered unusable (e.g., access to the account is locked down). The deletion of the private key results in locking down the source account in near real-time. The target account can be designated as a primary account to complete the failover process. In some aspects, NIM 134 can generate an additional instruction to cause the deletion of the compromised source account. Other functionalities associated with account replication and key configuration used in connection with network intrusion event detection and response are discussed below in reference to FIG. 4-FIG. 23.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, the one or more metadata databases 112, the execution platform 110, and the storage platform 104, are shown in FIG. 1 as individual discrete components. However, each of the compute service manager 108, the one or more metadata databases 112, execution platform 110, and storage platform 104 may be implemented as a distributed system (e.g., distributed across multiple systems/platforms at multiple geographic locations). Additionally, each of the compute service manager 108, the one or more metadata databases 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the one or more metadata databases 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the storage platform 104. Thus, the computing resources and cache resources are not restricted to specific data storage devices 120-1 to 120-N. Instead, all computing resources and all cache resources may retrieve data from, and store data to, any of the data storage resources in the storage platform 104.

Figure 2:
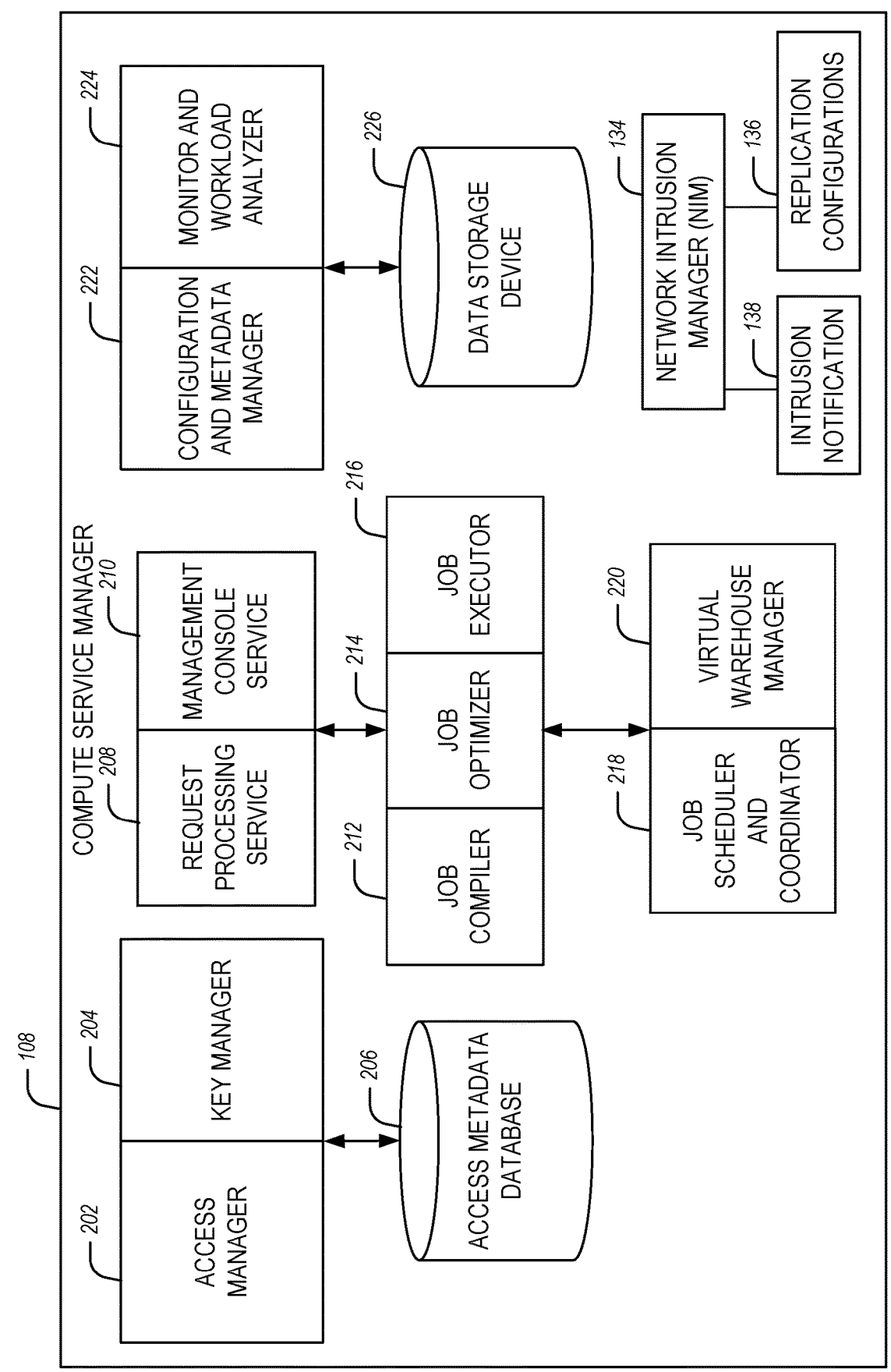
FIG. 2 is a block diagram illustrating the components of a compute service manager including a NIM, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to an access metadata database 206, which is an example of the one or more metadata databases 112. Access manager 202 handles authentication and authorization tasks for the systems described herein. The key manager 204 facilitates the use of remotely stored credentials to access external resources such as data resources in a remote storage device. As used herein, the remote storage devices may also be referred to as "persistent storage devices" or "shared storage devices." For example, the key manager 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the key manager 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in the execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in the execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the NIM 134 configured to perform the disclosed functionalities associated with network intrusion event detection and response. For example, NIM 134 uses replication configurations 136 to perform account replication of one or more accounts of a user, which accounts can be used as failover accounts when a network intrusion event is detected. Additionally, NIM 134 generates intrusion notification 138 which can cause the deletion of the private key of the user used to encrypt data files of the affected account.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless concerning the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with execution platform 110, virtual warehouses 1, . . . , N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

Execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some embodiments, at least one of the execution nodes of execution platform 110 (e.g., execution node 302-1) can be configured with the NIM 134.

Some example embodiments involve provisioning a remote account of a user—a type of account that is referred to herein at times as a "remote-deployment account," a "remote-deployment account of a user," a "user remote account," and the like—with one or more replication group objects for purposes of performing replication from a source account into a target account.

It is also noted here that the terms "replication" and "refresh" (and similar forms such as "replicating," "refreshing," etc.) are used throughout the present disclosure. Generally speaking, "refresh" and its various forms are used to refer to a command or instruction that causes a database to start receiving one-way syncing (e.g., "pushed" updates). The term "replicate" and its various forms are used in a few different ways. In some cases, the "replicate" terms are used as a precursor to the "refresh" terms, where the "replicate" terms refer to the preparatory provisioning (populating, storing, etc.) of account objects from one user account to another user account, in some cases along with one or task objects as described herein. In this regard, the "replicate" terms relate to the replication of data from one account of a user to another account of the same user. When used in that manner, the "replicate" terms can be analogized to putting up scaffolding for a building, and the "refresh" terms can be analogized to putting up the building.

In some aspects, the "replicate" terms may also be used as a general label for what a data consumer may request (e.g., via their data provider) when the data consumer wishes to have made available to them a local instance of a given database at a given remote-deployment account of their data provider. That is, the data consumer may request "replication" of a given database of a data provider to a given remote deployment, and a data platform may responsively perform operations such as the more technical "replicate" operations (putting up the scaffolding) using one or more replication configurations and "refresh" operations (building, populating, filling in, etc.) that are also described herein.

Figure 4:
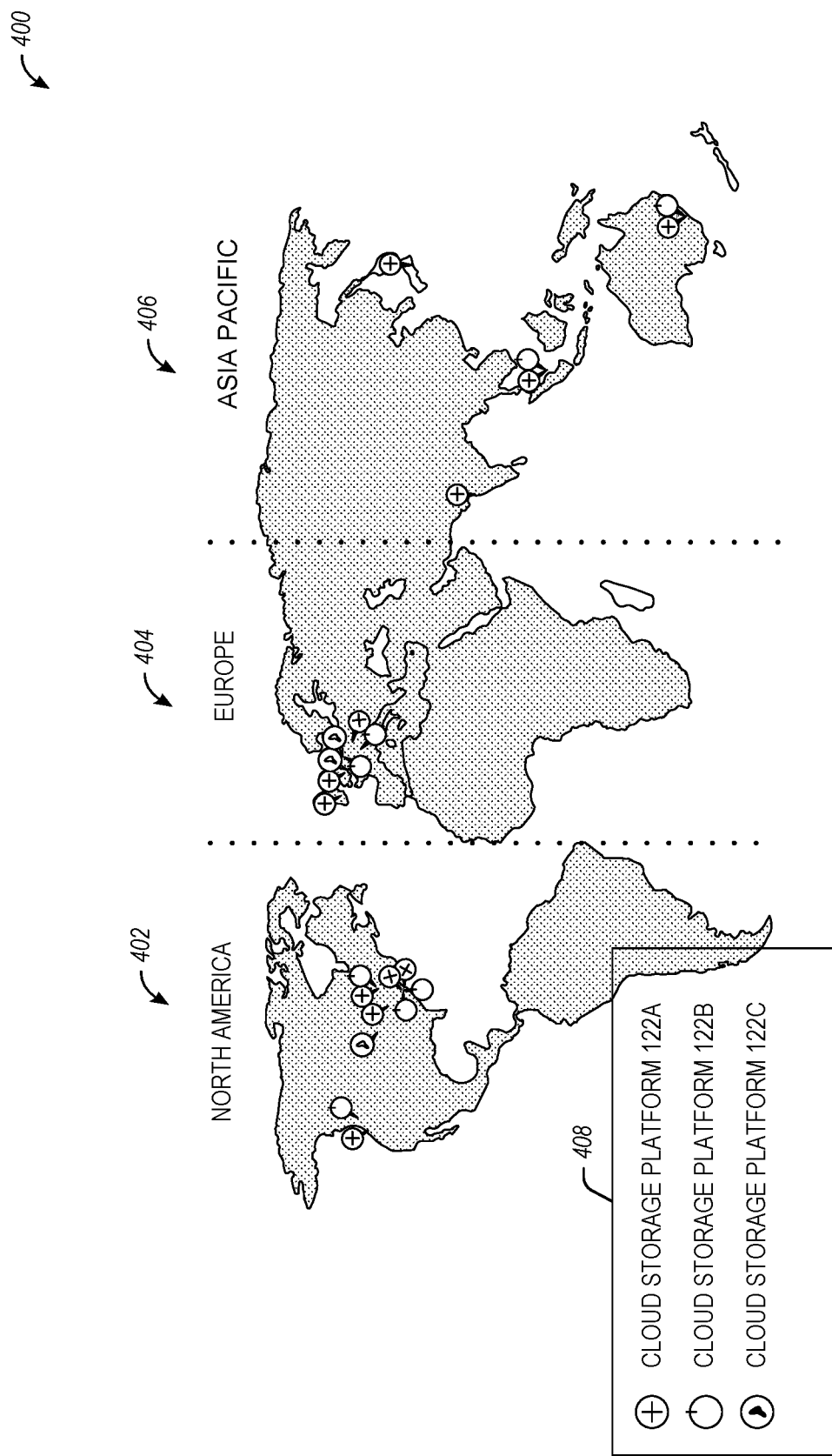
FIG. 4 illustrates an example regional-deployment map for the example database system of FIG. 1, in accordance with some embodiments of the present disclosure.

FIG. 4 illustrates an example regional-deployment map 400 for the example database system of FIG. 1, in accordance with some embodiments of the present disclosure. The regional-deployment map 400 is presented purely by way of example and not limitation, as different numbers and/or boundaries of regions could be demarcated in different implementations. As can be seen in FIG. 4, the regional-deployment map 400 includes three example geographic regions: North American region 402, European region 404, and Asia Pacific region 406. Moreover, various instances of deployments of the network-based database system 102 are depicted on the regional-deployment map 400. A legend 408 shows symbols used for three different deployments of the network-based database system 102, including deployments that are hosted by the cloud-storage platform 122A, deployments hosted by the cloud-storage platform 122B, and deployments that are hosted by the cloud-storage platform 122C. Cloud-storage platforms 122A, 122B, and 122C can be collectively referred to as storage platforms 122, which are also illustrated in FIG. 1.

In some embodiments, NIM 134 uses replication configurations to replicate an account of a user from one deployment to another (e.g., a source account in a first deployment is replicated to a target account in a second deployment) or within the same deployment (e.g., a source account in a first deployment is replicated to a target account in the first deployment). Such replicated accounts can be used to perform failover (e.g., automatically) when a network intrusion event is detected.

Figure 5:
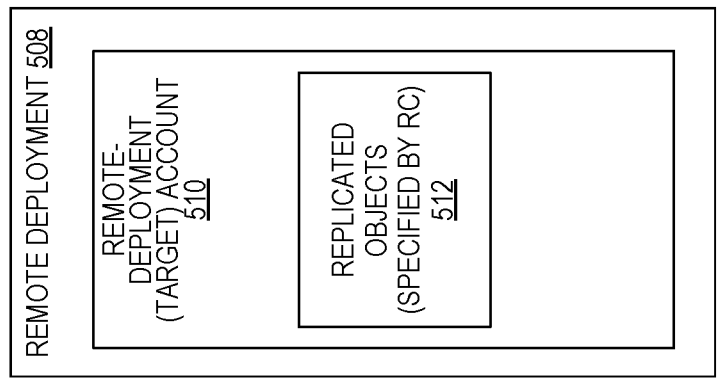
FIG. 5 illustrates an example multi-deployment arrangement using replication configurations for object replication in connection with a network intrusion response, in accordance with some embodiments of the present disclosure.
Figure 5:
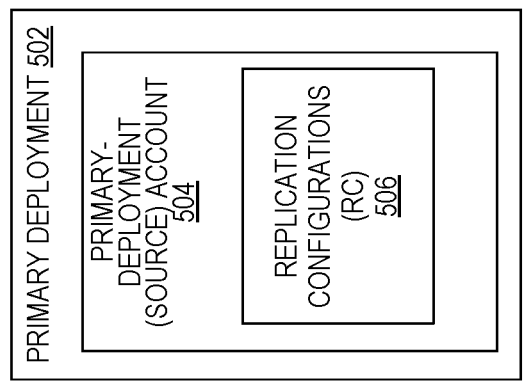

FIG. 5 illustrates an example multi-deployment arrangement 500 using replication configurations for object replication in connection with a network intrusion response, in accordance with some embodiments of the present disclosure. The example multi-deployment arrangement 500 includes a primary deployment 502 of the network-based database system 102 and a remote deployment 508 of the network-based database system 102. In an example scenario, a user (e.g., the user associated with client device 114) has a primary-deployment account 504 (also referred to as a source account 504) at the primary deployment 502, and a remote-deployment account 510 (also referred to as a target account 510) at the remote deployment 508. In some embodiments, the primary deployment 502 and the remote deployment 508 may be located in the same or different geographic regions.

In some embodiments, the source account 504 of the primary deployment 502 can include replication configurations (RC) 506. The RC 506 can be the same as RC 136 and can include information used in connection with the replication of the source account 504 into the remote deployment 508, generating target account 510 with replicated data (e.g., replicated data objects 512).

In some embodiments, RC 506 can include the following information used for performing the account replication of the source account 504 to generate the target account 510:
  (a) a list of account objects (e.g., files of the user) associated with the source account that will be replicated into the target account;
  (b) account privileges for accessing the target account or individual data objects that have been replicated;
  (c) computing resources (e.g., virtual warehouses and/or one or more storage locations) which can be used in connection with the account replication;
  (d) replication schedule to specify the date and time of replication or frequency of replication (if periodic replication is configured); and
  (e) location of one or more encryption keys used for encrypting the replicated data associated with the target account.

The above list of configurations is exemplary and can include additional configurations used in connection with account replication.

Figure 6:
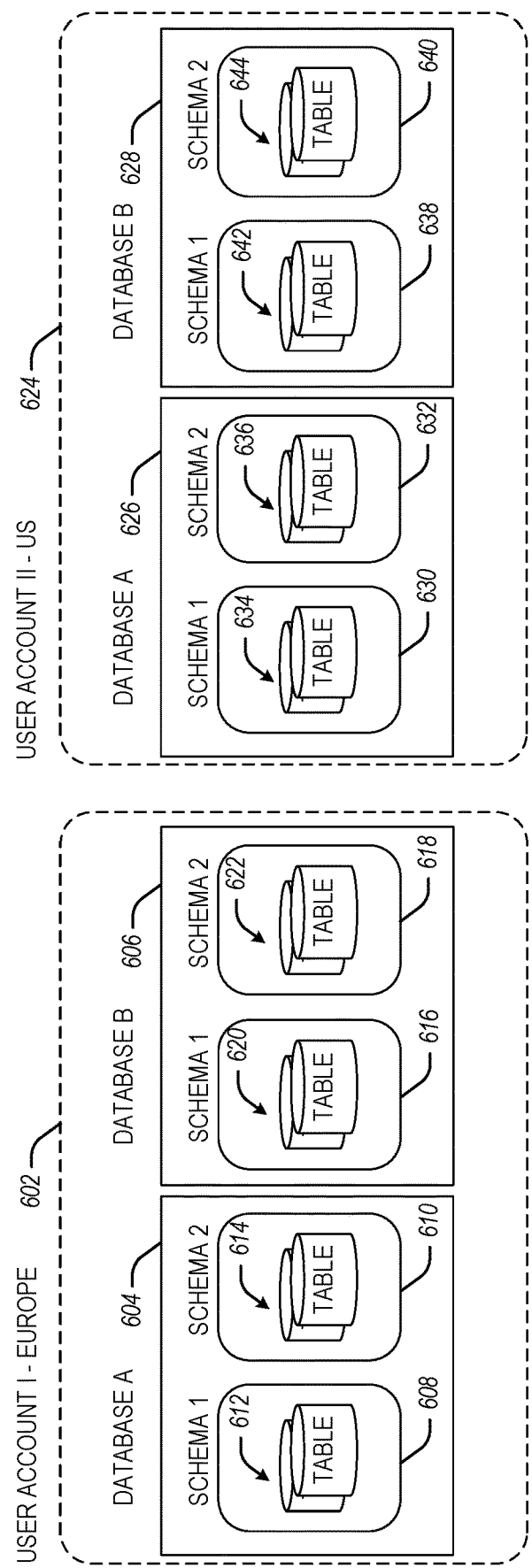
FIG. 6 illustrates another example multi-deployment arrangement which can be used in connection with a network intrusion response, in accordance with some embodiments of the present disclosure.

FIG. 6 illustrates another example multi-deployment arrangement 600 which can be used in connection with a network intrusion response, in accordance with some embodiments of the present disclosure. Referring to FIG. 6, the multi-deployment arrangement 600 can include two accounts of a user-a source account 602 which is replicated into a target account 624. In some aspects, the source account 602 and the target account 624 are located in different deployments of the network-based database system 102 (e.g., one is in Europe and one is in the United States). Source account 602 includes databases 604 and 606, which are replicated into corresponding databases 626 and 628 in target account 624. Database 604 includes schema 608 with tables 612 and schema 610 with tables 614. Database 606 includes schema 616 with tables 620 and schema 618 with tables 622. Corresponding database 626 includes schema 630 with tables 634 and schema 632 with tables 636. Corresponding database 628 includes schema 638 with tables 642 and schema 640 with tables 644.

In some embodiments, the user can use different private keys for each of account 602 and account 624. In some aspects, each of the tables in databases 604, 606, 626, and 628 can be encoded with a unique file encryption key based on the corresponding private key of the account. In some aspects, each of the tables in databases 604, 606, 626, and 628 can be encoded with a unique key based on the corresponding private key of the account as well as a root key that is associated with (and is unique to) the corresponding deployment of the account. In some embodiments, NIM 134 can detect a network intrusion and can generate a notification (or an instruction) to the user causing the private key used for encrypting data in the affected account to be deleted.

Figure 7:
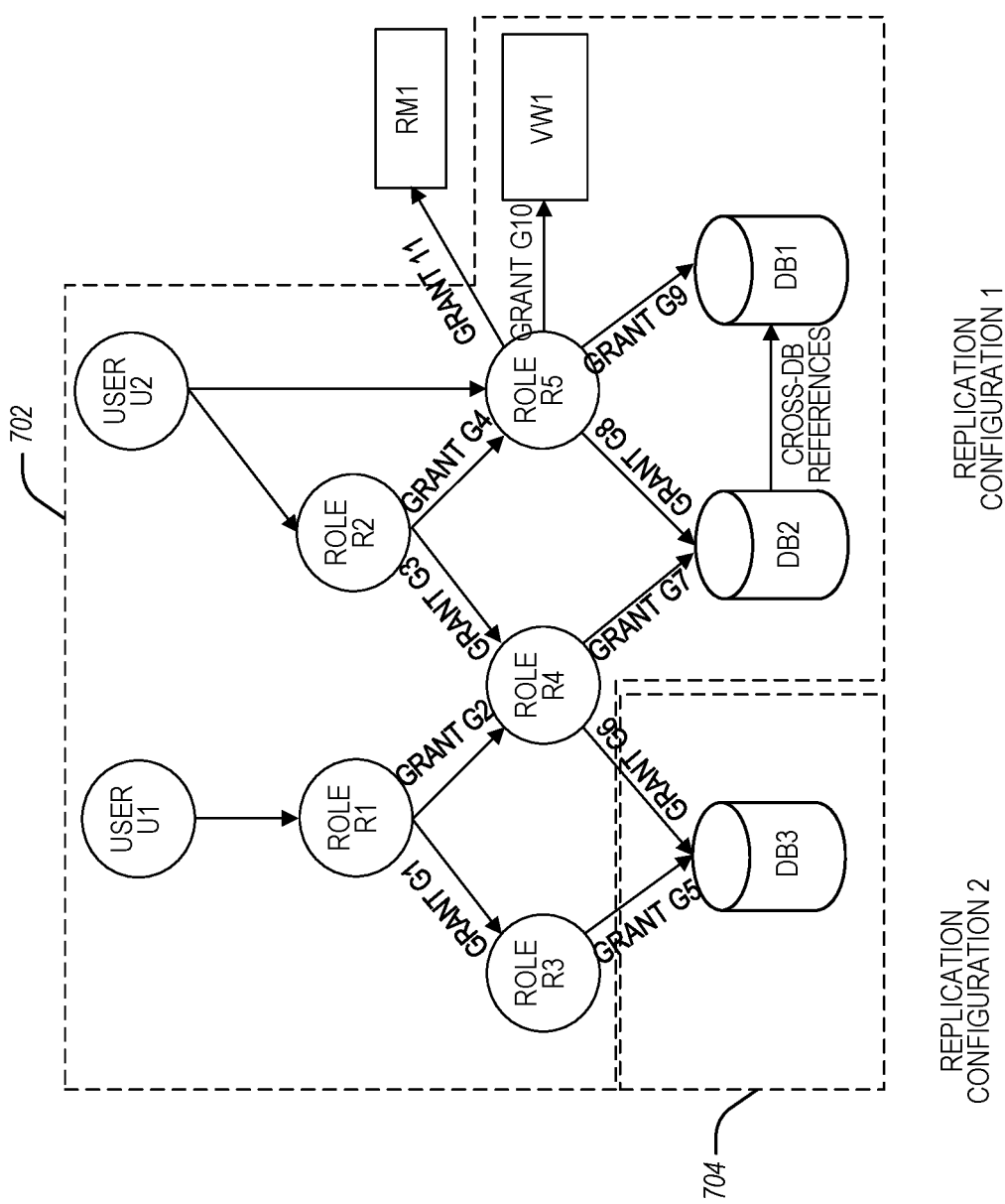
FIG. 7 illustrates example replication configurations specifying different account objects, in accordance with some embodiments of the present disclosure.

FIG. 7 illustrates diagram 700 of example replication configurations specifying different account objects, in accordance with some embodiments of the present disclosure. In some embodiments, replication configurations (e.g., RC 136) can include account-entity domains such as users, roles, warehouses, databases, etc., and optionally include/exclude certain account domains, and also specific databases, schemas, and tables. This enables a near-zero knob experience for simple use cases for users of the network-based database system who want to replicate their entire account and also enables advanced use cases such as filtering out certain databases, schemas, and tables for cost control, or independent replication/failover for databases that belong to different business units of the user.

Referring to FIG. 7, NIM 134 can configure a first replication configuration 702 and a second replication configuration 704. Replication configuration 702 identifies the following objects for replication from a source account into a target account: users account objects U1 and U2 associated with corresponding roles account objects R1 and R2. Roles account objects R1 and R2 are associated with additional roles account objects R3, R4, and R5. Roles account objects R4 and R5 are associated with databases DB1 and DB2 as well as virtual warehouse VW1 via different grants. Since DB1 and DB2 have cross-database references (or database dependencies), both databases are included in the same replication configuration. Roles R1-R5, databases DB1, DB2, and virtual warehouse VW1 are associated with grants G1, G2, G3, G4, G7, G8, G9, and G10 (as illustrated in FIG. 7). In some embodiments, database dependencies can be verified upon a refresh command and a notification can be provided to the client device associated with the account that is being replicated.

Replication configurations 704 include database DB3 which is associated with roles R3 and R4 via grants G5 and G6. In some aspects, the replication configurations can be defined by the NIM 134 based on the configurations 131 received from the client device 114 of the user.

Figure 8:
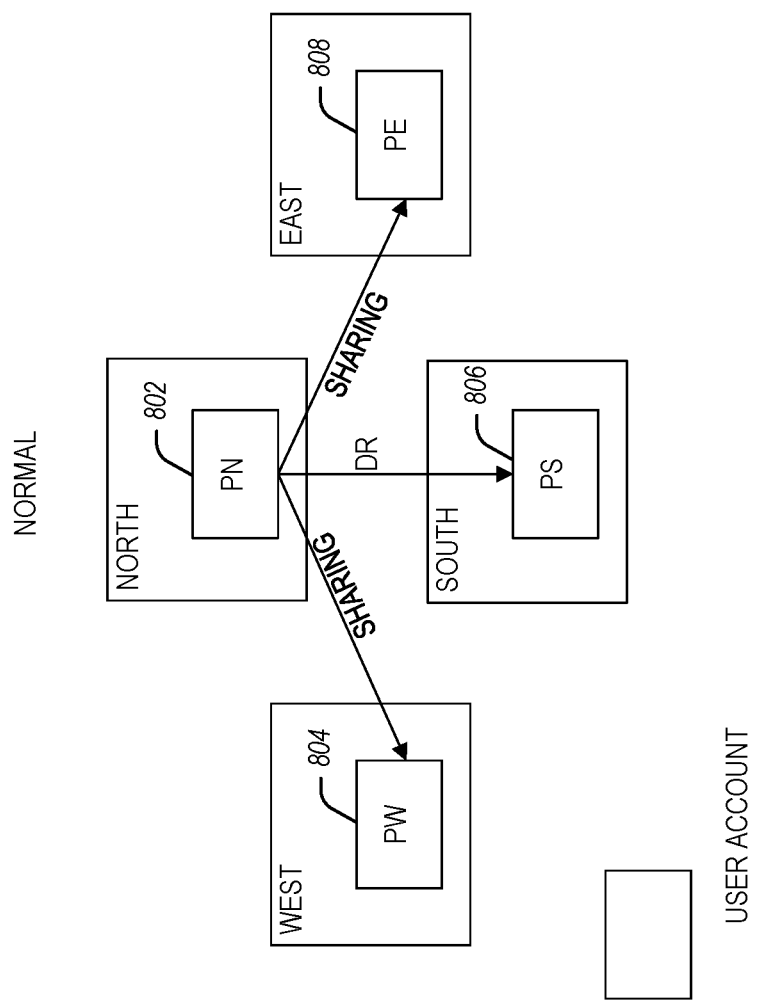
FIG. 8 and FIG. 9 illustrate example replication configuration usage scenarios in connection with a network intrusion response, in accordance with some embodiments of the present disclosure.
Figure 9:
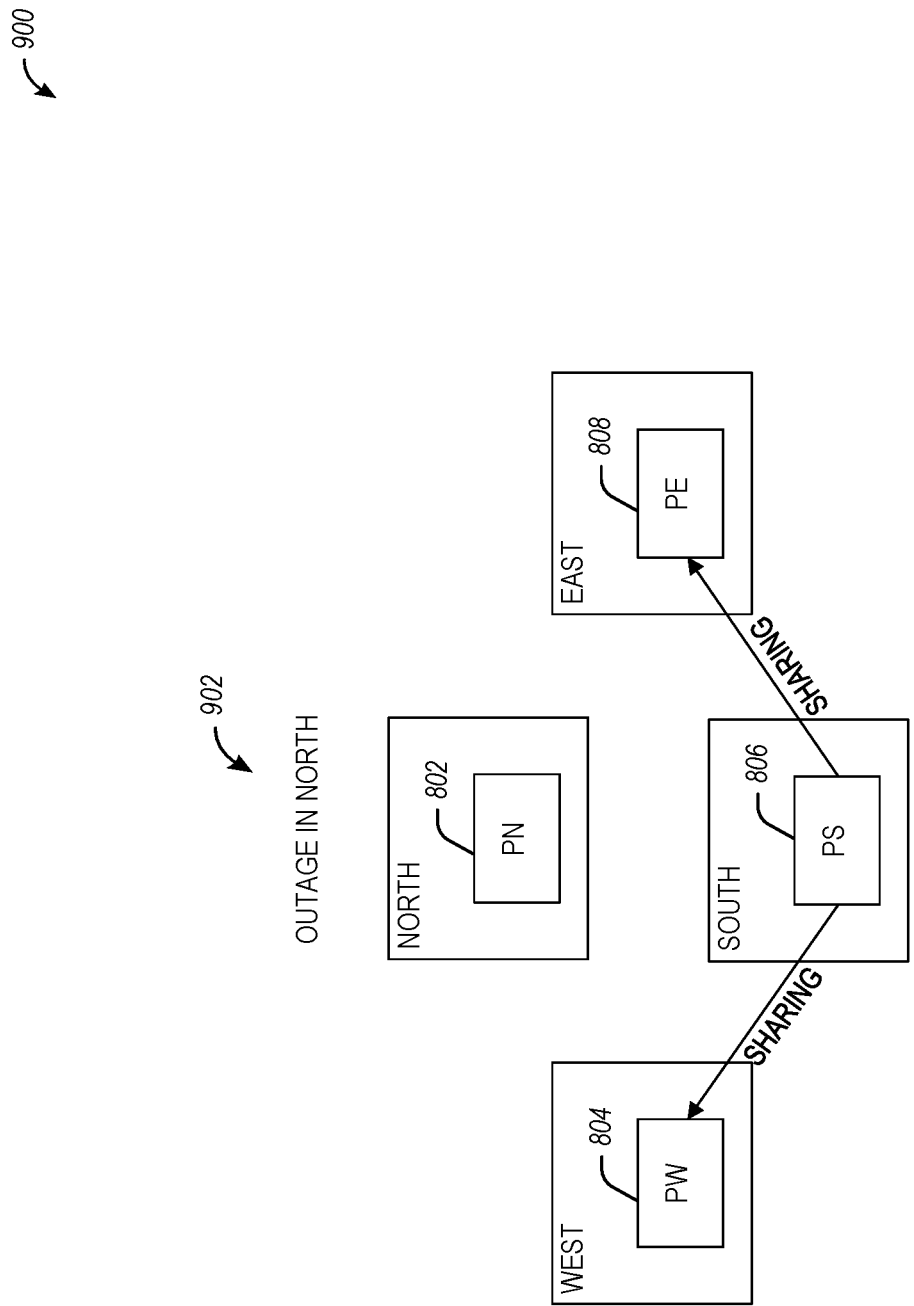

FIG. 8 and FIG. 9 illustrate example replication configuration usage scenarios in connection with a network intrusion response, in accordance with some embodiments of the present disclosure. Referring to FIG. 8, use case 800 illustrates the replication of account objects from a source (or primary) account 802 of a user into other user accounts 804, 806, and 808, with all user accounts being deployed at different geographic locations. In the event of a detected network intrusion event detected at account 802, disaster recovery (DR) and a response to the intrusion event can be initiated by promoting the target account 806 to a primary account and generating a notification to the user causing the deletion of the private key of the user used for encryption of data files in the affected account. As illustrated in FIG. 8, account objects replication from the source account 802 to target accounts 804 and 808 can be used for global data sharing and generating read replicas of account objects using the corresponding replication configurations. The replication configurations used for data object replication from source account 802 to target account 806 can be used for promoting that target account 806 to a primary/source account in the event of a network intrusion event is detected (e.g., as illustrated in FIG. 9).

FIG. 9 illustrates a network intrusion event 900 where network intrusion is detected in the North location 902 where source account 802 is deployed. Since account 802 was previously replicated using replication configurations into account 806, account 806 can be promoted to a primary/source account which can in turn initiate account replication using the replication configurations into accounts 804 and 808 for purposes of global data sharing and any subsequent failovers in case of additional network intrusion events are detected.

In some embodiments, NIM 134 configures the replication of the source account of the user into the target account and monitors for network intrusion events. In some aspects, NIM 134 can detect the network intrusion event based on one or more of the following:
(a) a number of failed login attempts for an account of the user is higher than a first threshold number; and
(b) a number of account metadata searches for an account of the user is higher than a second threshold number.

Even though two criteria for detecting a network intrusion event are listed above, the disclosure is not limited in this regard, and other criteria may be used as well by the NIM 134.

Figure 10:
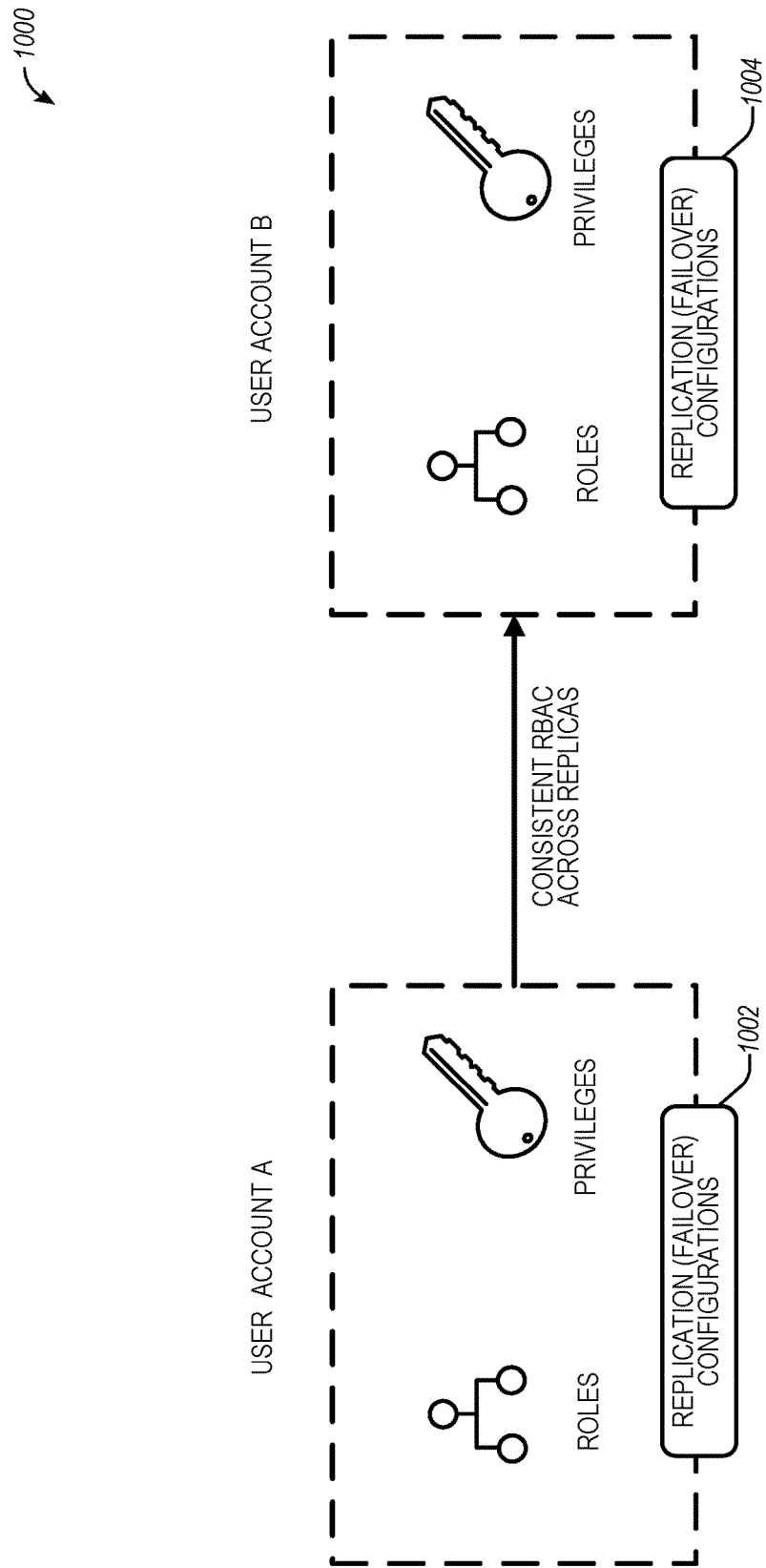
FIG. 10 and FIG. 11 illustrate example replication configurations and usages in connection with a network intrusion response, in accordance with some embodiments of the present disclosure.
Figure 11:
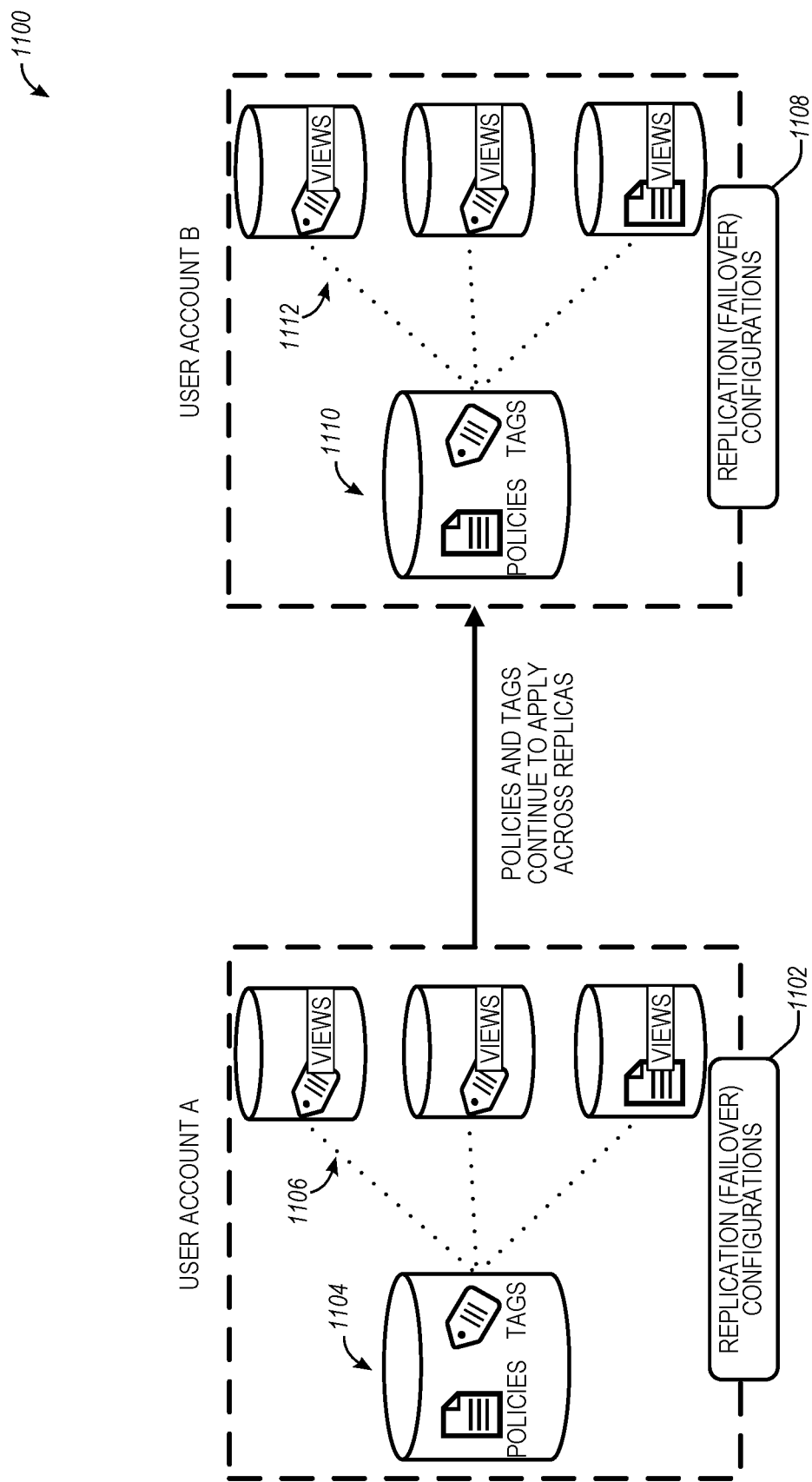

FIG. 10 and FIG. 11 illustrate example replication configurations and usages in connection with a network intrusion response, in accordance with some embodiments of the present disclosure.

Referring to FIG. 10, there is illustrated a use case scenario 1000 where replication configurations (or failover configuration) 1002 in account A of a user of a network-based database system are replicated as failover configurations 1004 in another account of the user (e.g., account B), which can be at the same or different deployment as account A. As illustrated in FIG. 10, roles and privileges associated with failover configurations 1002 are replicated as corresponding roles and privileges associated with failover configurations 1004 to achieve consistent role-based access control across replicas.

Referring to FIG. 11, there is illustrated a use case scenario 1100 where failover configurations 1102 in account A of a user of a network-based database system are replicated as failover configurations 1108 in account B of the same user. As illustrated in FIG. 11, failover configurations 1102 specify database 1104 which includes policies (e.g., masking, row access, or other policies) and tags. The tags are applied to multiple views 1106 in other databases. In some embodiments, failover configurations 1102 will include database 1104 as well as the related databases associated with views 1106. In this regard, the replicated failover configurations 1108 would also specify corresponding databases 1110 as well as databases corresponding to views 1112 so that the policies and tags continue to apply across replicas.

Figure 12:
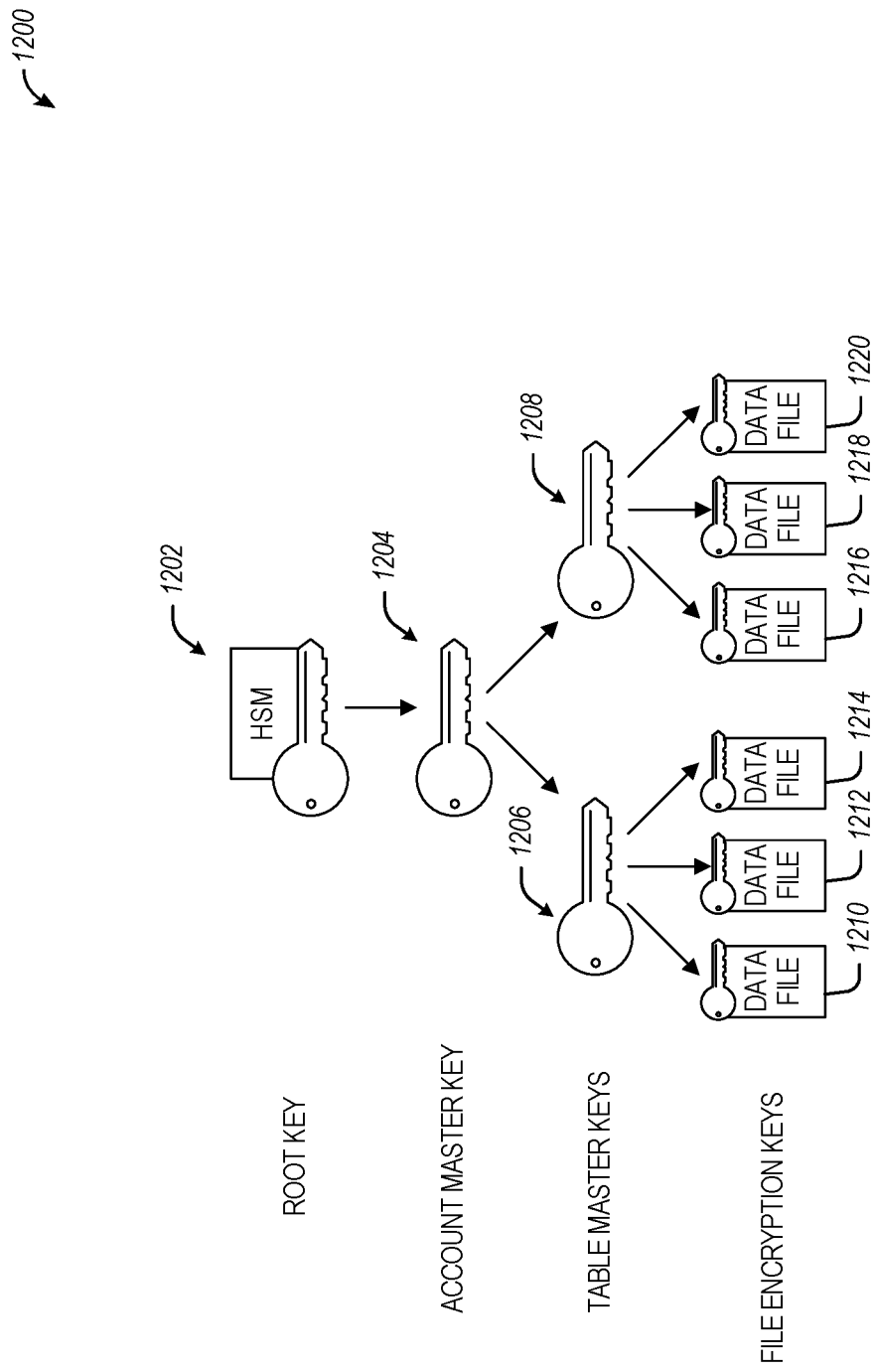
FIG. 12 is a diagram of the generation of file encryption keys based on a root key associated with a primary deployment of a database system, in accordance with some embodiments of the present disclosure.

FIG. 12 is a diagram 1200 of the generation of file encryption keys based on a root key associated with a primary deployment of a database system, in accordance with some embodiments of the present disclosure. Referring to FIG. 12, NIM 134 can generate file encryption keys 1210, 1212, 1214, 1216, 1218, and 1220 based on a root key 1202 associated with, e.g., a primary deployment of the network-based database system 102 where the source account of the user is located. In some aspects, the root key 1202 is a host service managed (HSM) key. In some aspects, NIM 134 uses root key 1202 to generate an account master key 1204 which is associated with the source account of the user (e.g., source account 504 at primary deployment 502). NIM 134 further generates table master keys 1206 and 1208 for corresponding separate tables including data files of the source account. Each of the files in the corresponding table is encrypted with corresponding file encryption keys 1210, 1212, 1214, 1216, 1218, and 1220 based on the table master keys 1206 and 1208. In this regard, file encryption keys 1210, 1212, 1214, 1216, 1218, and 1220 are based on the root key 1202.

Figure 13:
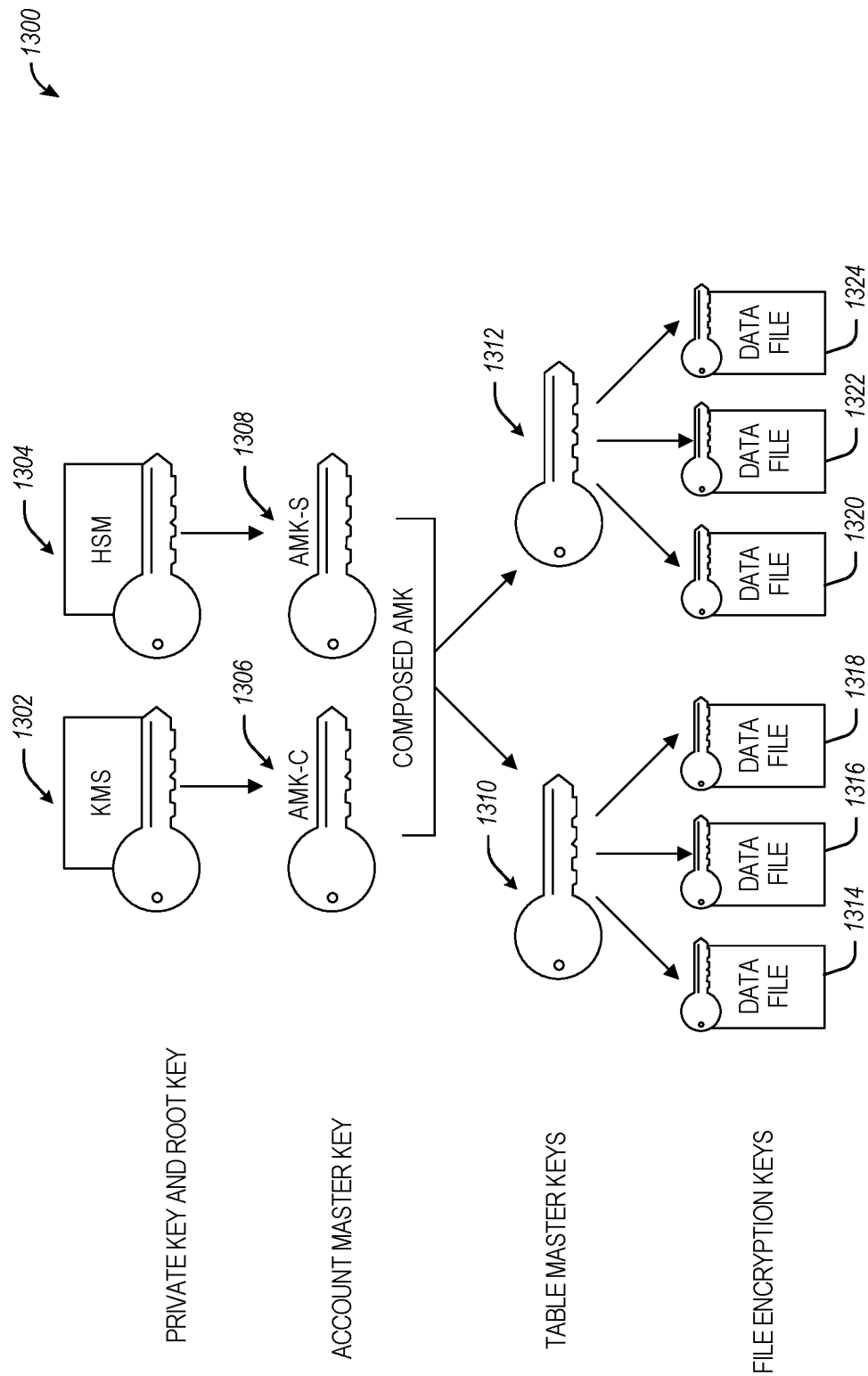
FIG. 13 is a diagram of the generation of file encryption keys based on a private key of a user and a root key associated with a primary deployment of a database system, in accordance with some embodiments of the present disclosure.

FIG. 13 is a diagram 1300 of the generation of file encryption keys based on a private key of a user and a root key associated with a primary deployment of a database system, in accordance with some embodiments of the present disclosure. Referring to FIG. 13, NIM 134 can generate file encryption keys 1314, 1316, 1318, 1320, 1322, and 1324 based on a private key 1302 of the user and a root key 1304 associated with, e.g., a primary deployment of the network-based database system 102 where the source account of the user is located. In some aspects, the root key 1304 is a host service managed (HSM) key and the private key 1302 is a key management service (KMS) key. In some aspects, NIM 134 uses the private key 1302 and the root key 1304 to generate account master keys 1306 and 1308 which are associated with the source account of the user (e.g., source account 504 at primary deployment 502). NIM 134 further generates table master keys 1310 and 1312 for corresponding separate tables including data files of the source account. Each of the files in the corresponding table is encrypted with corresponding file encryption keys 1314, 1316, 1318, 1320, 1322, and 1324 generated using the table master keys 1310 and 1312. In this regard, file encryption keys 1314, 1316, 1318, 1320, 1322, and 1324 are based on the private key 1302 and the root key 1304.

Figure 14:
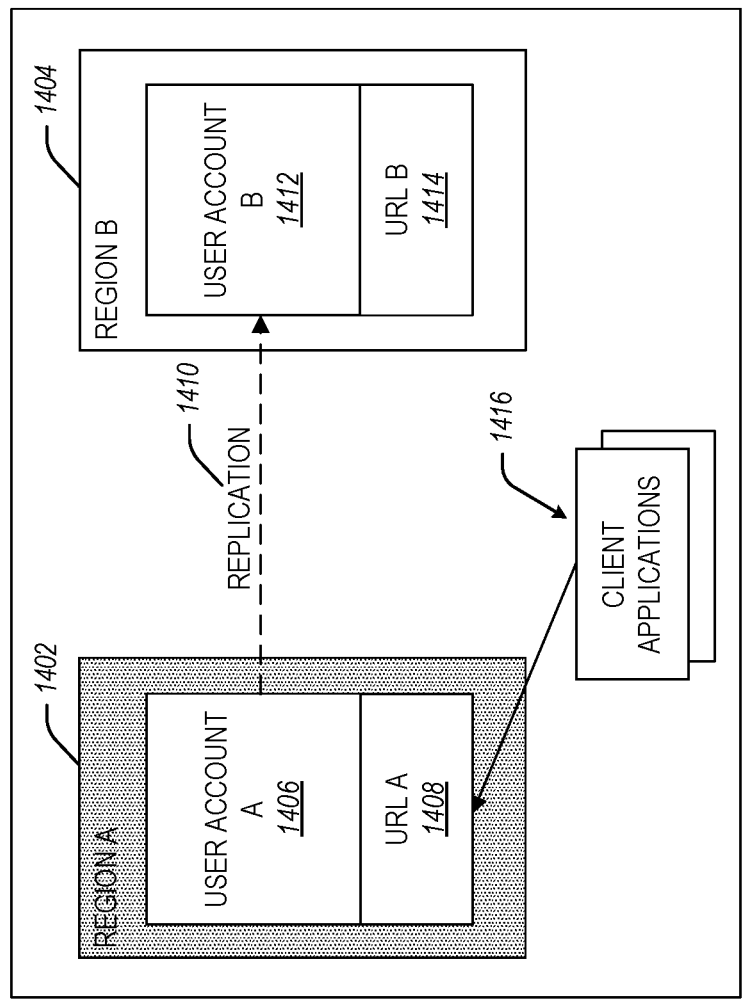
FIG. 14 is a diagram of account replication between different deployment regions in preparation for network intrusion event detection and response, in accordance with some embodiments of the present disclosure.
Figure 15:
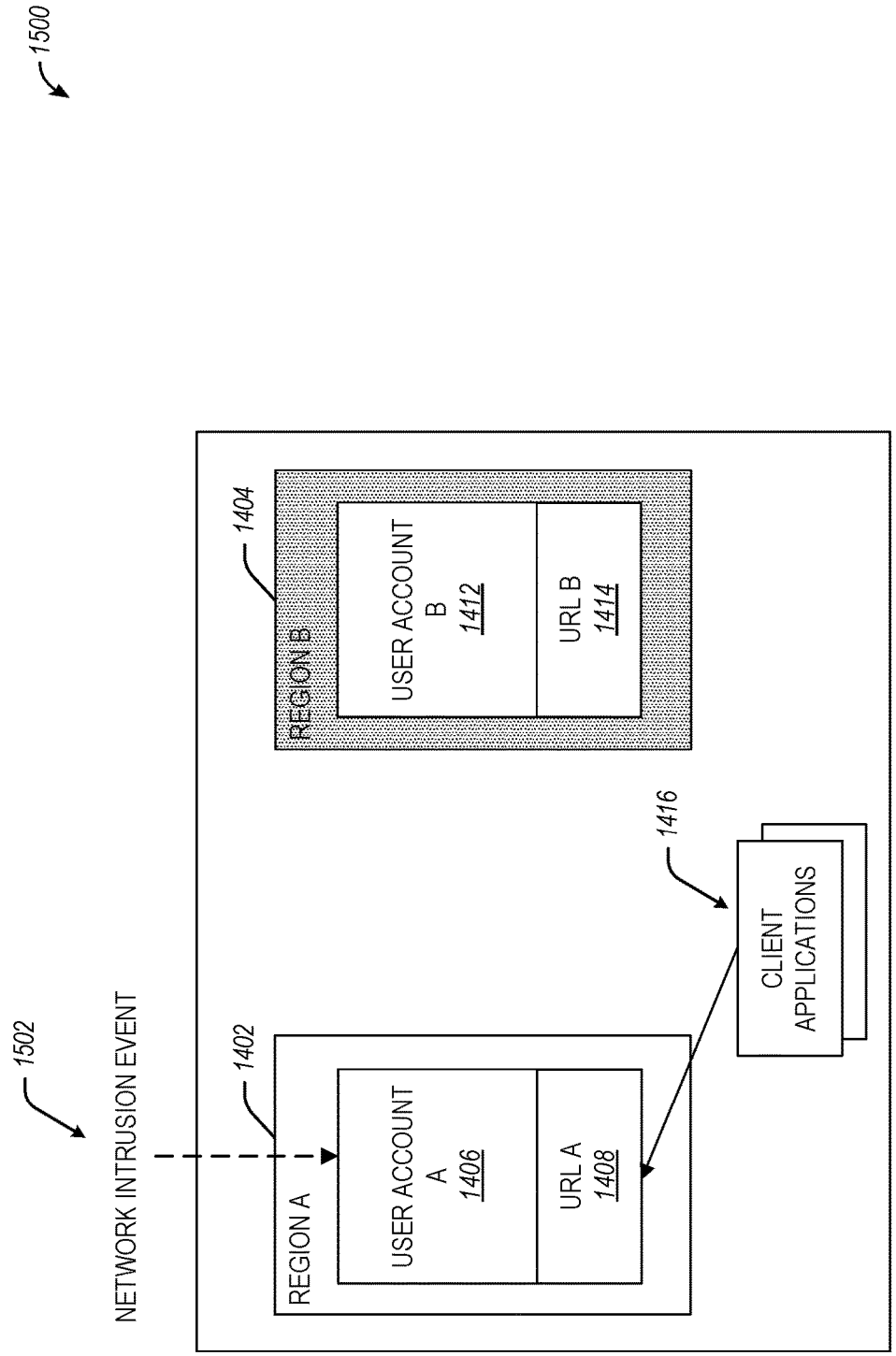
FIG. 15 is a diagram of account monitoring and detection of a network intrusion event, in accordance with some embodiments of the present disclosure.
Figure 16:
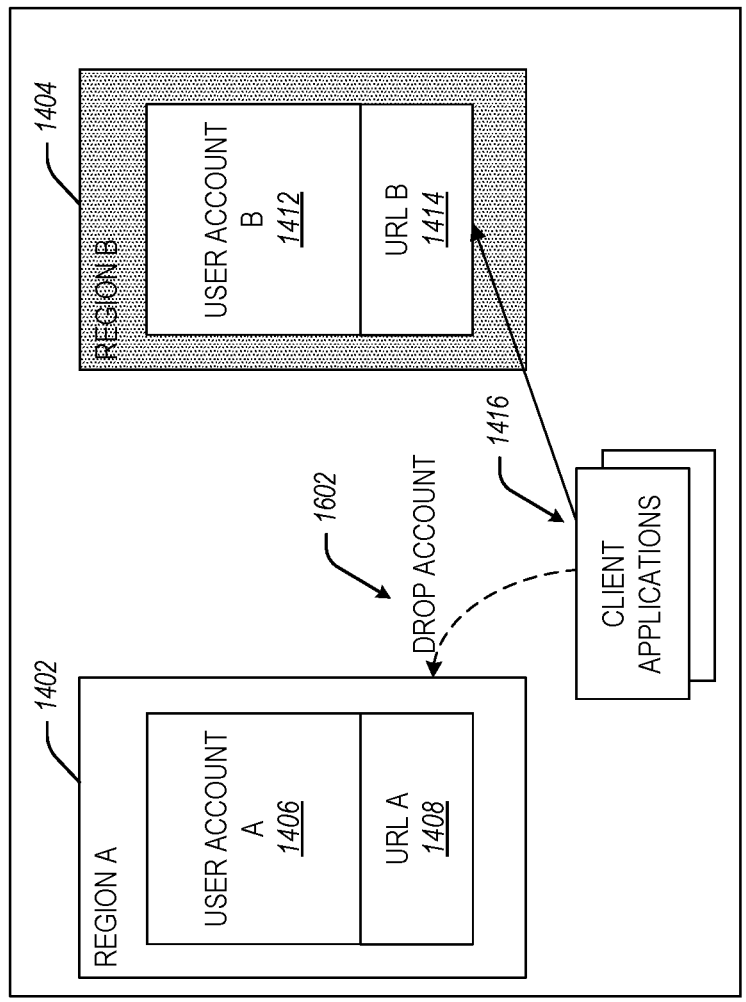
FIG. 16 is a diagram of network intrusion event recovery using a failover account in a different region, in accordance with some embodiments of the present disclosure.
Figure 17:
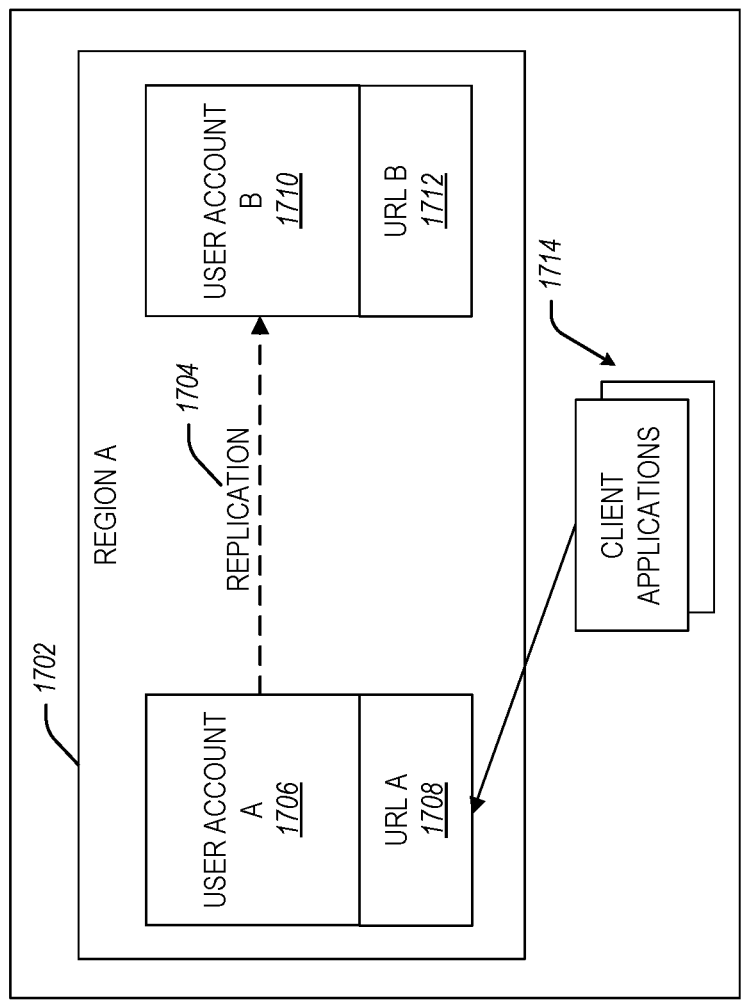
FIG. 17 is a diagram of account replication between a source account and a target account in a single deployment region in preparation for network intrusion event detection and response, in accordance with some embodiments of the present disclosure.
Figure 18:
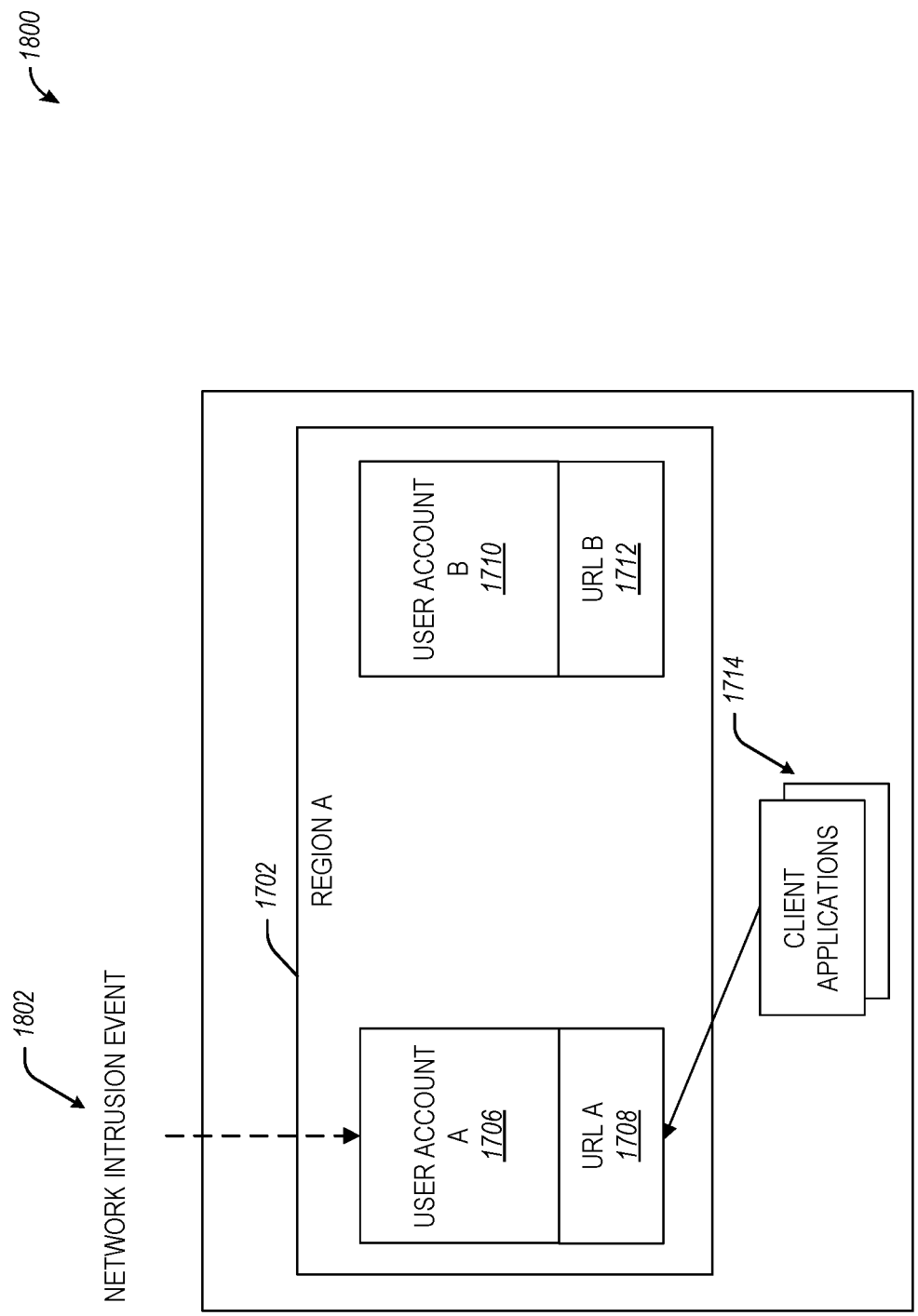
FIG. 18 is a diagram of account monitoring and detection of a network intrusion event, in accordance with some embodiments of the present disclosure.
Figure 19:
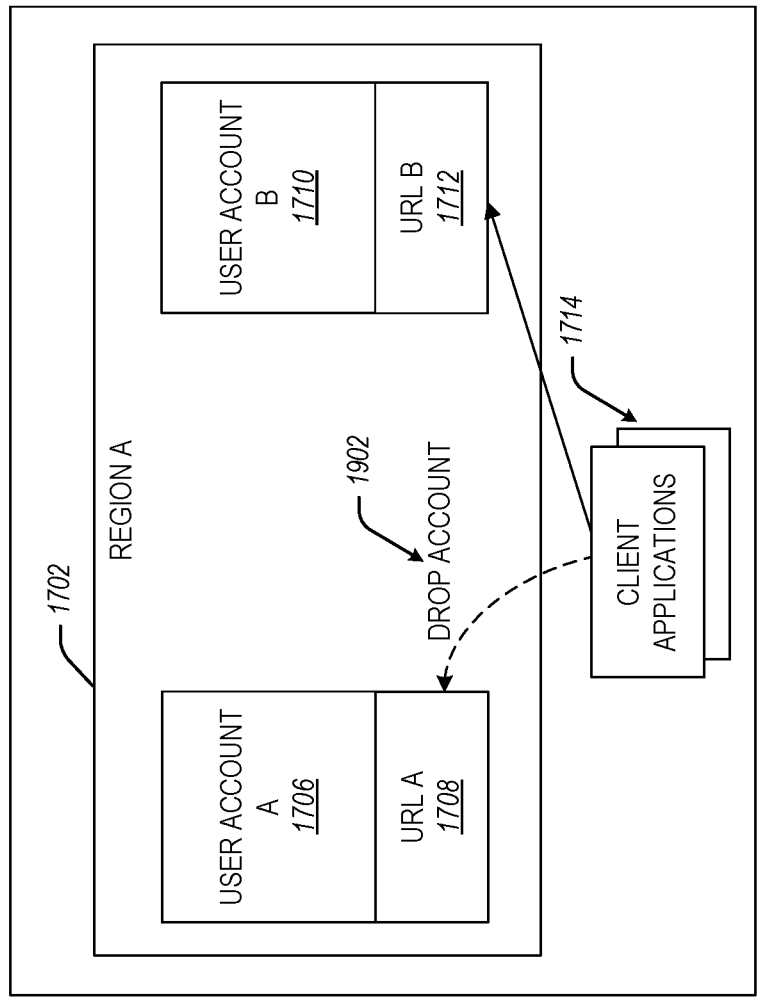
FIG. 19 is a diagram of network intrusion event recovery using a failover account in the same region, in accordance with some embodiments of the present disclosure.

In some embodiments, NIM 134 can monitor access to the source account of the user which includes the files encrypted with the file encryption keys 1314, 1316, 1318, 1320, 1322, and 1324. After a network intrusion event is detected, NIM 134 generates a notification to the user which causes the private key 1302 to be deleted. The deletion of the private key results in the failure of the file encryption keys 1314, 1316, 1318, 1320, 1322, and 1324 which renders the source account unusable (e.g., all access to the source account is locked out) and locked out. In some embodiments, the notification of the detected network intrusion event communicated by NIM 134 to the client device 114 of the user (e.g., intrusion notification 138) causes an automatic deletion of the private key 1302. In some aspects, intrusion notification 138 includes an instruction/command to authenticate the user and request deletion of the private key 1302. Example sequences associated with account replication and detection of network intrusion events are discussed in connection with FIGS. 14-19. FIGS. 14-16 illustrate functionalities associated with network intrusion event monitoring and detection when the source account is replicated to a target account in a different region. FIGS. 17-19 illustrate functionalities associated with network intrusion event monitoring and detection when the source account is replicated to a target account in the same region.

FIG. 14 is a diagram 1400 of account replication between different deployment regions in preparation for network intrusion event detection and response, in accordance with some embodiments of the present disclosure. Referring to FIG. 14, in preparation for network intrusion monitoring and detection, NIM 134 configures replication 1410 of source account 1406 of the user (e.g., using replication configurations 136) from a primary deployment 1402 to a target account 1412 at a remote deployment 1404. Data files associated with the source account 1406 can be accessed by one or more applications 1416 of the user using uniform resource locator (URL) 1408. Data files associated with the target account 1412 can be accessed by the one or more applications 1416 of the user using URL 1414.

In some aspects, source account 1406 includes multiple data files encrypted by file encryption keys 1314, 1316, 1318, 1320, 1322, and 1324 that are based on a private key of the user and a root key associated with the primary deployment 1402. After the files are replicated into target account 1412, NIM 134 generates new file encryption keys, which can be based on a new private key configured by the user and a new root key associated with the remote deployment 1404.

FIG. 15 is a diagram 1500 of account monitoring and detection of a network intrusion event, in accordance with some embodiments of the present disclosure. Referring to FIG. 15, NIM 134 monitors access to the source account 1406 and detects a network intrusion event 1502 affecting source account 1406.

After the network intrusion event 1502 is detected, NIM 134 generates a notification (e.g., intrusion notification 138) to the user which causes the private key 1302 to be deleted. The deletion of the private key results in the failure of the file encryption keys 1314, 1316, 1318, 1320, 1322, and 1324 which renders the source account 1406 unusable.

FIG. 16 is a diagram 1600 of network intrusion event recovery using a failover account in a different region, in accordance with some embodiments of the present disclosure. Referring to FIG. 16, after NIM 134 detects the network intrusion event 1502, failover to the target account 1412 at the remote deployment 1404 is initiated. In some aspects, NIM 134 can generate the intrusion notification 138 to cause account 1406 to be dropped (e.g., at operation 1602). Additionally, NIM 134 can configure the target account 1412 as the new source account of the user, and notify the one or more client applications 1416 that the user files at the new source account can be accessed via URL 1414.

FIG. 17 is a diagram 1700 of account replication between a source account and a target account in a single deployment region in preparation for network intrusion event detection and response, in accordance with some embodiments of the present disclosure. Referring to FIG. 17, in preparation for network intrusion monitoring and detection, NIM 134 configures replication 1704 of source account 1706 of the user (e.g., using replication configurations 136) at a primary deployment 1702 to a target account 1710 at the same primary deployment 1702. Data files associated with the source account 1706 can be accessed by one or more applications 1714 of the user using URL 1708. Data files associated with the target account 1710 can be accessed by the one or more applications 1714 of the user using URL 1712.

In some aspects, source account 1706 includes multiple data files encrypted by file encryption keys 1314, 1316, 1318, 1320, 1322, and 1324 that are based on a private key of the user and a root key associated with the primary deployment 1702. After the files are replicated into target account 1710, NIM 134 generates new file encryption keys, which can be based on a new private key configured by the user and the same root key associated with the primary deployment 1702.

FIG. 18 is a diagram 1800 of account monitoring and detection of a network intrusion event, in accordance with some embodiments of the present disclosure. Referring to FIG. 18, NIM 134 monitors access to the source account 1706 and detects a network intrusion event 1802 affecting source account 1706.

After the network intrusion event 1802 is detected, NIM 134 generates a notification (e.g., intrusion notification 138) to the user which causes the private key 1302 to be deleted. The deletion of the private key results in the failure of the file encryption keys 1314, 1316, 1318, 1320, 1322, and 1324 which renders the source account 1706 unusable.

FIG. 19 is a diagram 1900 of network intrusion event recovery using a failover account in the same region, in accordance with some embodiments of the present disclosure. Referring to FIG. 19, after NIM 134 detects the network intrusion event 1802, failover to the target account 1710 at the primary deployment 1702 is initiated. In some aspects, NIM 134 can generate the intrusion notification 138 to cause account 1706 to be dropped (e.g., at operation 1902). Additionally, NIM 134 can configure the target account 1710 as the new source account of the user, and notify the one or more client applications 1714 that the user files at the new source account can be accessed via URL 1712.

Figure 20:
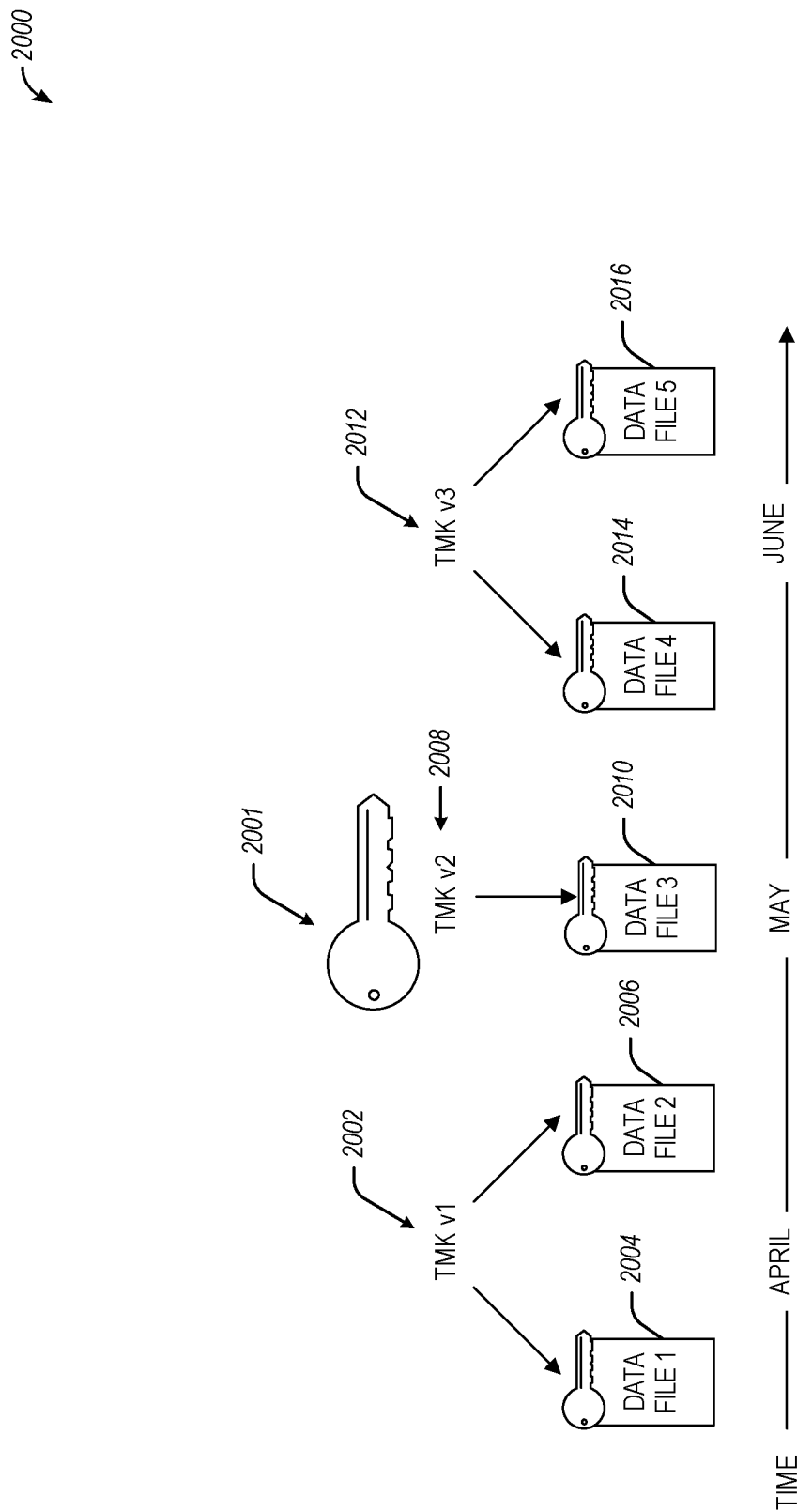
FIG. 20 is a diagram of key rotation which can be used in connection with network intrusion event detection and response, in accordance with some embodiments of the present disclosure.

FIG. 20 is a diagram 2000 of key rotation which can be used by NIM 134 in connection with network intrusion event detection and response, in accordance with some embodiments of the present disclosure. Referring to FIG. 20, NIM 134 can perform key rotation of one or more secure keys of an account of the user (e.g., one or more of the secure keys illustrated in FIG. 13). For example and as illustrated in FIG. 20, NIM 134 can perform a rotation of the table master key (TMK) 2001 so that different TMK versions (e.g., TMK 2002, TMK 2008, and TMK 2012) are used at different periods (e.g., monthly) to generate file encryption keys 2004, 2006, 2010, 2014, and 2016.

Figure 21:
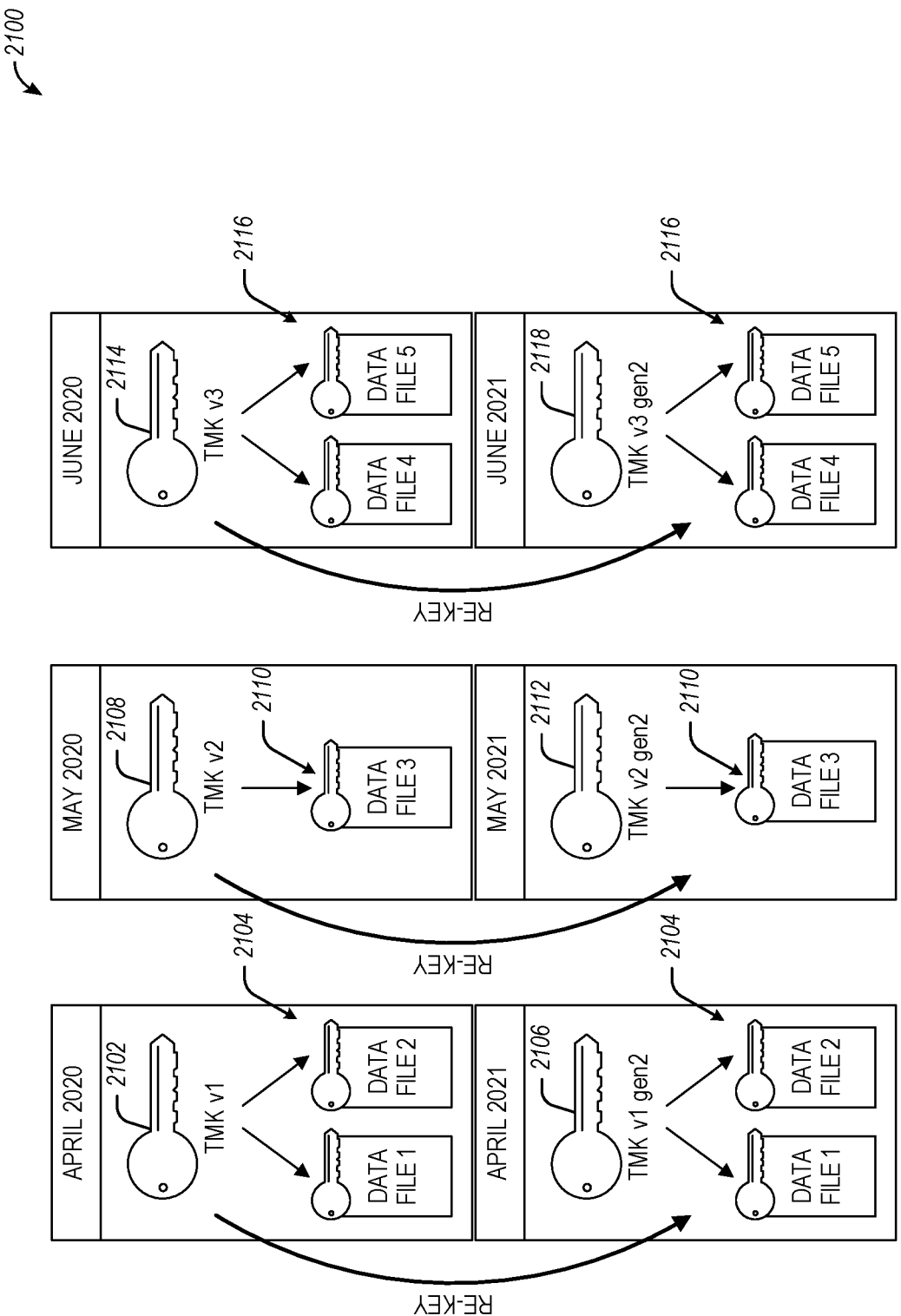
FIG. 21 is a diagram of key re-keying which can be used in connection with network intrusion event detection and response, in accordance with some embodiments of the present disclosure.

FIG. 21 is a diagram 2100 of key re-keying which can be used in connection with network intrusion event detection and response, in accordance with some embodiments of the present disclosure. Referring to FIG. 21, NIM 134 can further perform re-keying (e.g., generate new keys) of one or more secure keys of an account of the user (e.g., one or more of the secure keys illustrated in FIG. 13). For example and as illustrated in FIG. 21, NIM 134 generates TMK 2102 which is used for generating of file encryption keys 2104. At the anniversary of TMK 2102 (or at a different period), NIM 134 performs re-keying of TMK 2102 and generates a new TMK 2106 which is used for generating file encryption keys 2104.

Similarly, NIM 134 generates TMK 2108 which is used for generating file encryption keys 2110. At the anniversary of TMK 2108 (or at a different period), NIM 134 performs re-keying of TMK 2108 and generates a new TMK 2112 which is used for generating file encryption keys 2110. NIM 134 generates TMK 2114 which is used for generating file encryption keys 2116. At the anniversary of TMK 2114 (or at a different period), NIM 134 performs re-keying of TMK 2114 and generates a new TMK 2118 which is used for generating file encryption keys 2116.

Figure 22:
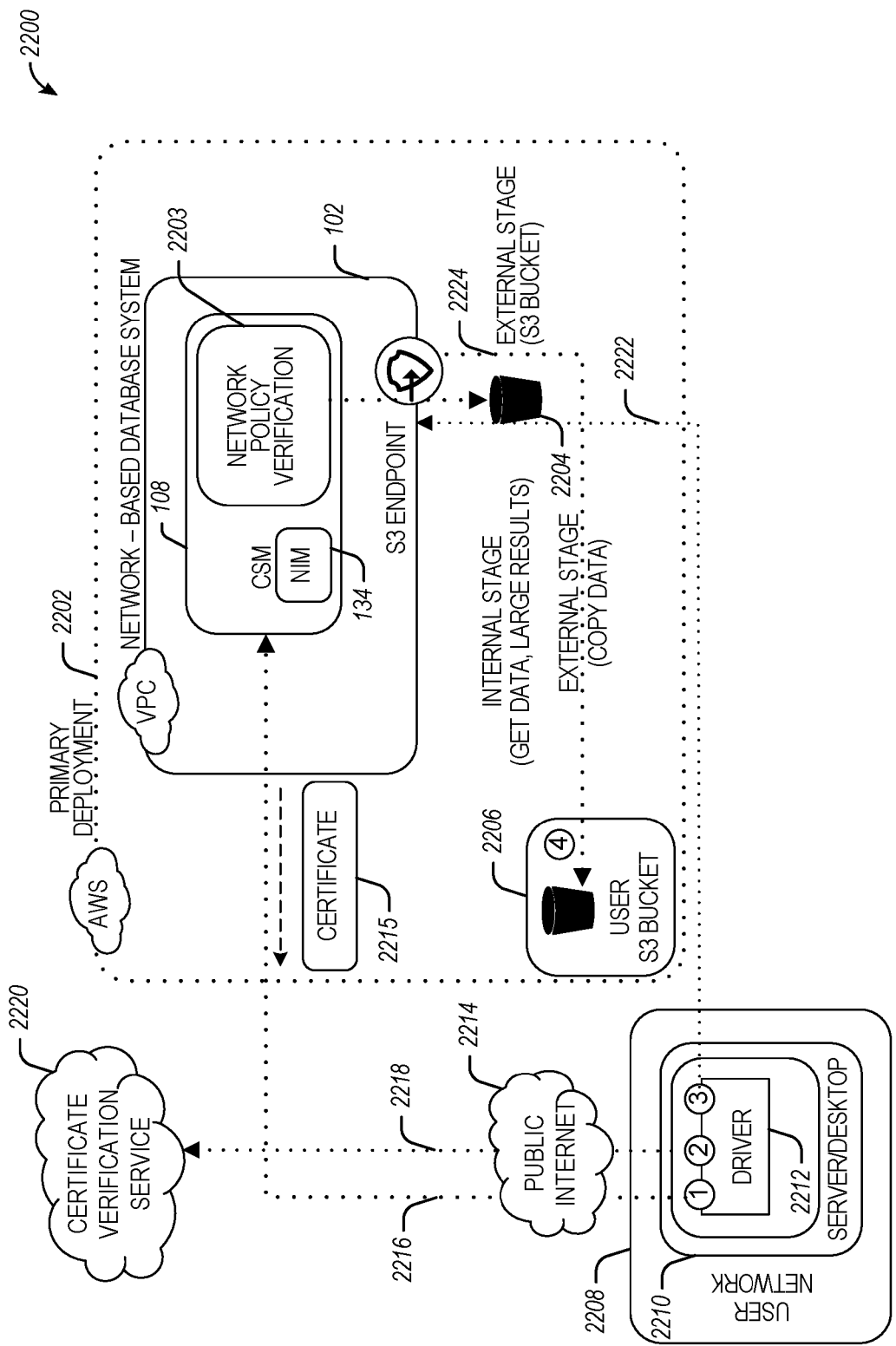
FIG. 22 is a diagram of using a NIM to detect a network intrusion event in a network-based database system accessed from a user network, in accordance with some embodiments of the present disclosure.

FIG. 22 is a diagram 2200 of using a NIM to detect a network intrusion event in a network-based database system accessed from a user network, in accordance with some embodiments of the present disclosure. Referring to FIG. 22, the network-based database system 102 is configured at a primary deployment 2202 which is in communication with the client device 2210 in a user network 2208 via the driver 2212 and the Internet 2214.

In some aspects, the compute service manager 108 includes NIM 134 and a network policy verification service 2203 (which can be configured by NIM 134). The primary deployment 2202 also includes an external stage 2204 and a user stage 2206. In some aspects, the user stage 2206 can be used for storing one or more private keys configured by the user using client device 2210 and used in connection with generating file encryption keys as discussed herein.

In operation for accessing services provided by the network-based database system 102, the user uses client device 2210 to communicate a login username and password to the compute service manager 108 (e.g., operation 2216). The network policy verification service 2203 verifies if the login attempt associated with operation 2216 originates from an authorized Internet protocol (IP) address. If the IP address is authorized, the network policy verification service 2203 communicates back to the client device 2210 a certificate 2215. At operation 2218, certificate 2215 is verified by the certificate verification service 2220. Upon successful verification, access to the network-based database system 102 using the login username and password is granted.

In some aspects, the client device 2210 can access data (e.g., data stored at external stage 2204) during operation 2222, or access data (e.g., copy or store data) at the user stage 2206 during operation 2224.

In some embodiments, NIM 134 is configured to detect a network intrusion event during operations 2216 or 2218 (e.g., based on the number of login attempts). In some aspects, NIM 134 is configured to detect a network intrusion event during operations 2222 or 2224 (e.g., based on the number of metadata requests, based on the number of storage requests, based on the number of read requests, etc.). NIM 134 can perform the disclosed functionalities when a network intrusion event is detected.

Figure 23:
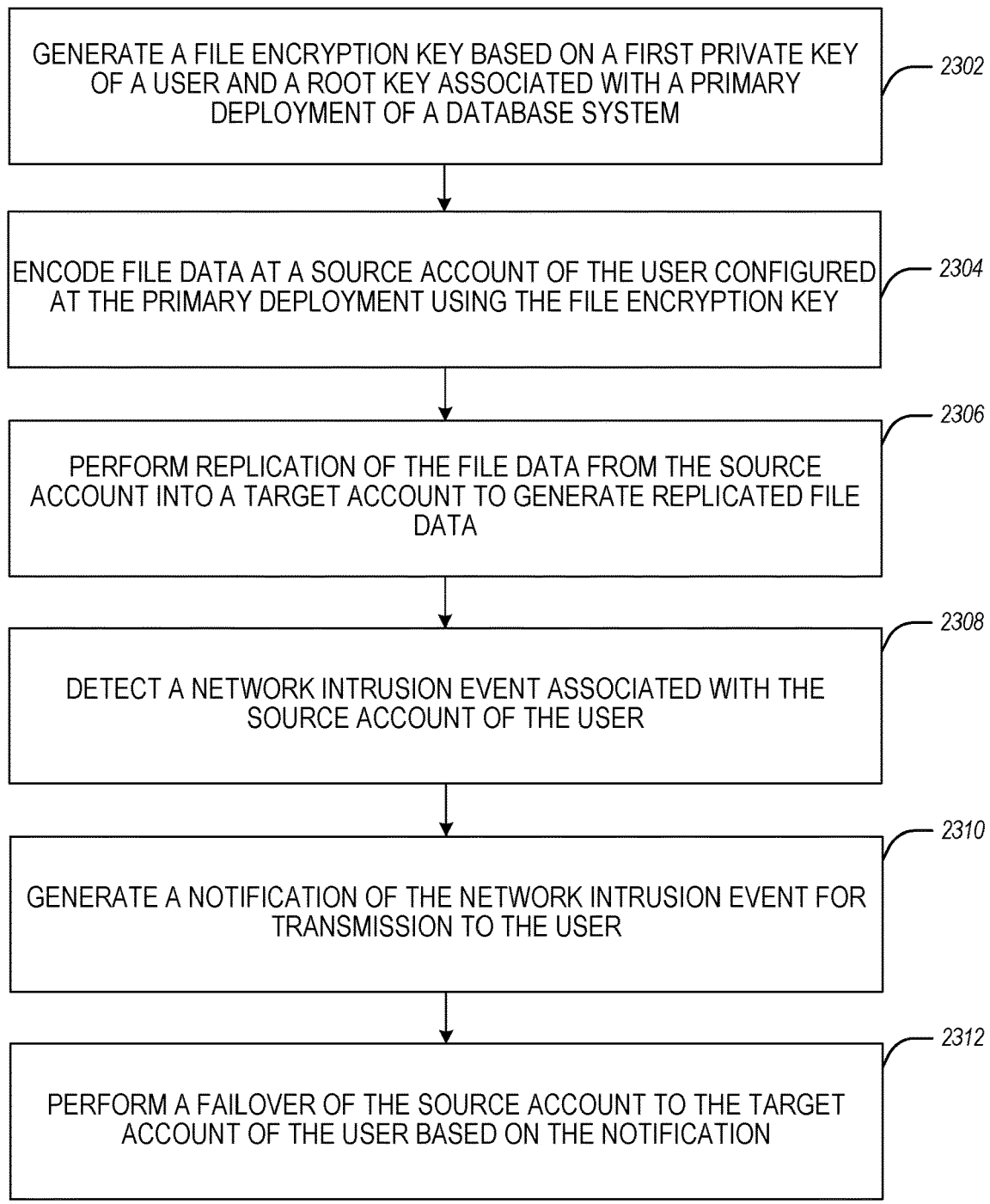
FIG. 23 is a flow diagram illustrating the operations of a database system in performing a method for network intrusion event detection and response, in accordance with some embodiments of the present disclosure.

FIG. 23 is a flow diagram illustrating the operations of a database system in performing method 2300 for network intrusion event detection and response, in accordance with some embodiments of the present disclosure. Method 2300 may be embodied in computer-readable instructions for execution by one or more hardware components (e.g., one or more processors) such that the operations of method 2300 may be performed by components of the network-based database system 102, such as a network node (e.g., NIM 134 executing on a network node of the compute service manager 108) or computing device (e.g., client device 114) which may be implemented as machine 2400 of FIG. 24 and may be configured with an application connector performing the disclosed functions. Accordingly, method 2300 is described below, by way of example with reference thereto. However, it shall be appreciated that method 2300 may be deployed on various other hardware configurations and is not intended to be limited to deployment within the network-based database system 102.

At operation 2302, a file encryption key is generated based on a first private key of a user and a root key associated with a primary deployment of a database system. For example and referring to FIG. 13, file encryption key 1314 is generated based on the private key 1302 and the root key 1304 of the primary deployment including the source account of the user.

At operation 2304, file data is encoded at a source account of the user using the file encryption key. The source account is configured at the primary deployment of the database system.

At operation 2306, replication of the file data is performed from the source account into a target account of the user to generate replicated file data (e.g., as described in connection with FIGS. 14-19).

At operation 2308, a network intrusion event associated with the source account of the user is detected. For example, NIM 134 can detect network intrusion event 1502 (e.g., as discussed in connection with FIG. 15) or network intrusion event 1802 (e.g., as discussed in connection with FIG. 18).

At operation 2310, a notification of the network intrusion event is generated for transmission to the user. For example, NIM 134 can generate an intrusion notification 138 as discussed herein.

At operation 2312, a failover of the source account to the target account of the user is performed based on the notification. In some aspects, the failover grants the user, access to the replicated file data based at least on a second private key of the user. For example and referring to FIG. 16, replicated file data associated with target account 1412 is encoded with file encryption keys based on a second private key of the user, which is different from the first private key used for the file encryption keys of the data files associated with the compromised source account 1406. In some embodiments, the notification further causes the deletion of the first private key, which in effect disables access to the compromised source account 1406.

Figure 24:
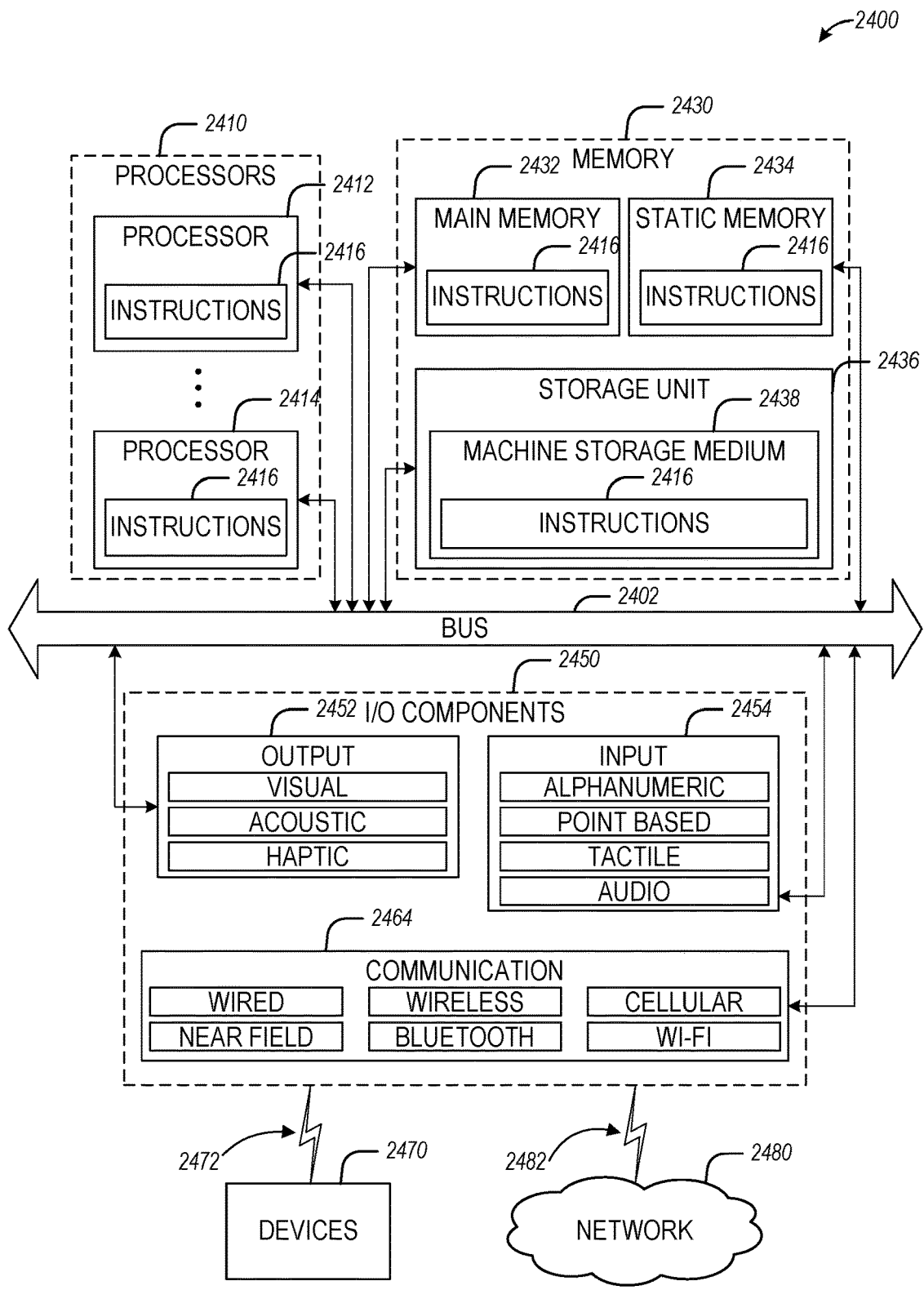
FIG. 24 illustrates a diagrammatic representation of a machine in the form of a computer system within which a set of instructions may be executed for causing the machine to perform any one or more of the methodologies discussed herein, in accordance with some embodiments of the present disclosure.

FIG. 24 illustrates a diagrammatic representation of a machine 2400 in the form of a computer system within which a set of instructions may be executed for causing the machine 2400 to perform any one or more of the methodologies discussed herein, according to an example embodiment. Specifically, FIG. 24 shows a diagrammatic representation of machine 2400 in the example form of a computer system, within which instructions 2416 (e.g., software, a program, an application, an applet, an app, or other executable code) for causing the machine 2400 to perform any one or more of the methodologies discussed herein may be executed. For example, instructions 2416 may cause machine 2400 to execute any one or more operations of method 2300 (or any other technique discussed herein, for example in connection with FIG. 4-FIG. 22). As another example, instructions 2416 may cause machine 2400 to implement one or more portions of the functionalities discussed herein. In this way, instructions 2416 may transform a general, non-programmed machine into a particular machine 2400 (e.g., the client device 114, the compute service manager 108, or a node in the execution platform 110) that is specially configured to carry out any one of the described and illustrated functions in the manner described herein. In yet another embodiment, instructions 2416 may configure the client device 114, the compute service manager 108, and/or a node in the execution platform 110 to carry out any one of the described and illustrated functions in the manner described herein.

In alternative embodiments, the machine 2400 operates as a standalone device or may be coupled (e.g., networked) to other machines. In a networked deployment, machine 2400 may operate in the capacity of a server machine or a client machine in a server-client network environment, or as a peer machine in a peer-to-peer (or distributed) network environment. The machine 2400 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 2416, sequentially or otherwise, that specify actions to be taken by the machine 2400. Further, while only a single machine 2400 is illustrated, the term "machine" shall also be taken to include a collection of machines 2400 that individually or jointly execute the instructions 2416 to perform any one or more of the methodologies discussed herein.

Machine 2400 includes processors 2410, memory 2430, and input/output (I/O) components 2450 configured to communicate with each other such as via a bus 2402. In some example embodiments, the processors 2410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2412 and a processor 2414 that may execute the instructions 2416. The term "processor" is intended to include multi-core processors 2410 that may comprise two or more independent processors (sometimes referred to as "cores") that may execute instructions 2416 contemporaneously. Although FIG. 24 shows multiple processors 2410, machine 2400 may include a single processor with a single core, a single processor with multiple cores (e.g., a multi-core processor), multiple processors with a single core, multiple processors with multiple cores, or any combination thereof.

The memory 2430 may include a main memory 2432, a static memory 2434, and a storage unit 2436, all accessible to processors 2410 such as via the bus 2402. The main memory 2432, the static memory 2434, and the storage unit 2436 store the instructions 2416 embodying any one or more of the methodologies or functions described herein. The instructions 2416 may also reside, completely or partially, within the main memory 2432, within the static memory 2434, within machine storage medium 2438 of the storage unit 2436, within at least one of the processors 2410 (e.g., within the processor's cache memory), or any suitable combination thereof, during execution thereof by the machine 2400.

The I/O components 2450 include components to receive input, provide output, produce output, transmit information, exchange information, capture measurements, and so on. The specific I/O components 2450 that are included in a particular machine 2400 will depend on the type of machine. For example, portable machines such as mobile phones will likely include a touch input device or other such input mechanisms, while a headless server machine will likely not include such a touch input device. It will be appreciated that the I/O components 2450 may include many other components that are not shown in FIG. 24. The I/O components 2450 are grouped according to functionality merely for simplifying the following discussion and the grouping is in no way limiting. In various example embodiments, the I/O components 2450 may include output components 2452 and input components 2454. The output components 2452 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 2454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 2450 may include communication components 2464 operable to couple the machine 2400 to a network 2480 or devices 2470 via a coupling 2482 and a coupling 2472, respectively. For example, the communication components 2464 may include a network interface component or another suitable device to interface with network 2480. In further examples, communication components 2464 may include wired communication components, wireless communication components, cellular communication components, and other communication components to provide communication via other modalities. The device 2470 may be another machine or any of a wide variety of peripheral devices (e.g., a peripheral device coupled via a universal serial bus (USB)). For example, as noted above, machine 2400 may correspond to any one of the client device 114, the compute service manager 108, or the execution platform 110, and the devices 2470 may include the client device 114 or any other computing device described herein as being in communication with the network-based database system 102 or the storage platform 104.

The various memories (e.g., 2430, 2432, 2434, and/or memory of the processor(s) 2410 and/or the storage unit 2436) may store one or more sets of instructions 2416 and data structures (e.g., software) embodying or utilized by any one or more of the methodologies or functions described herein. These instructions 2416, when executed by the processor(s) 2410, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 2480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 2480 or a portion of network 2480 may include a wireless or cellular network, and coupling 2482 may be a Code Division Multiple Access (CDMA) connection, a Global System for Mobile communications (GSM) connection, or another type of cellular or wireless coupling. In this example, the coupling 2482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2416 may be transmitted or received over the network 2480 using a transmission medium via a network interface device (e.g., a network interface component included in the communication components 2464) and utilizing any one of several well-known transfer protocols (e.g., hypertext transfer protocol (HTTP)). Similarly, instructions 2416 may be transmitted or received using a transmission medium via coupling 2472 (e.g., a peer-to-peer coupling or another type of wired or wireless network coupling) to device 2470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2416 for execution by the machine 2400, and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: generating a file encryption key based on a first private key of a user and a root key associated with a primary deployment of a database system; encoding file data at a source account of the user, the source account configured at the primary deployment of the database system, and the encoding using the file encryption key; performing replication of the file data from the source account into a target account of the user to generate replicated file data; detecting a network intrusion event associated with the source account of the user; generating a notification of the network intrusion event for transmission to the user; and performing a failover of the source account to the target account of the user based on the notification, the failover granting the user access to the replicated file data based at least on a second private key of the user.

In Example 2, the subject matter of Example 1 includes, the operations further comprising: retrieving replication configurations from the source account of the user, the replication configurations identifying the target account and one or more data objects for replication, the one or more data objects including the file data; and performing the replication based on the replication configurations.

In Example 3, the subject matter of Example 2 includes subject matter where the replication configurations further indicate the target account is located at the primary deployment of the database system, and the operations further comprising: encoding the replicated file data at the target account using a second file encryption key, the second file encryption key based on the root key associated with the primary deployment and the second private key of the user.

In Example 4, the subject matter of Example 3 includes, the operations further comprising: generating an account master key for the target account of the user at the primary deployment using the root key and the second private key.

In Example 5, the subject matter of Example 4 includes, the operations further comprising: generating a table master key for a target account table storing the replicated file data at the primary deployment, the table master key based on the account master key for the target account; and generating the second file encryption key based on the table master key for the target account table.

In Example 6, the subject matter of Examples 2-5 includes subject matter where the replication configurations further indicate the target account is located at a remote deployment of the database system, and the operations further comprising: encoding the replicated file data at the target account using a second file encryption key, the second file encryption key based on a second root key associated with the remote deployment and the second private key of the user.

In Example 7, the subject matter of Example 6 includes, the operations further comprising: generating an account master key for the target account of the user at the remote deployment using the second root key and the second private key.

In Example 8, the subject matter of Example 7 includes, the operations further comprising: generating a table master key for a target account table storing the replicated file data at the remote deployment, the table master key based on the account master key for the target account; and generating the second file encryption key based on the table master key for the target account table.

In Example 9, the subject matter of Examples 1-8 includes, the operations further comprising: configuring the notification of the network intrusion event to include an instruction causing deletion of the first private key of the user, the first private key stored at a storage location of the user that is external to the database system.

In Example 10, the subject matter of Examples 1-9 includes, the operations further comprising: configuring the notification of the network intrusion event to include an instruction causing deletion of the source account of the user; and configuring the target account as a new source account of the user based on the deletion of the source account.

Example 11 is a method comprising: generating, by at least one hardware processor, a file encryption key based on a first private key of a user and a root key associated with a primary deployment of a database system; encoding file data at a source account of the user, the source account configured at the primary deployment of the database system, and the encoding using the file encryption key; performing replication of the file data from the source account into a target account of the user to generate replicated file data; detecting a network intrusion event associated with the source account of the user; generating a notification of the network intrusion event for transmission to the user; and performing a failover of the source account to the target account of the user based on the notification, the failover granting the user access to the replicated file data based at least on a second private key of the user.

In Example 12, the subject matter of Example 11 includes, retrieving replication configurations from the source account of the user, the replication configurations identifying the target account and one or more data objects for replication, the one or more data objects including the file data; and performing the replication based on the replication configurations.

In Example 13, the subject matter of Example 12 includes subject matter where the replication configurations further indicate the target account is located at the primary deployment of the database system, and the method further comprises: encoding the replicated file data at the target account using a second file encryption key, the second file encryption key based on the root key associated with the primary deployment and the second private key of the user.

In Example 14, the subject matter of Example 13 includes, generating an account master key for the target account of the user at the primary deployment using the root key and the second private key.

In Example 15, the subject matter of Example 14 includes, generating a table master key for a target account table storing the replicated file data at the primary deployment, the table master key based on the account master key for the target account; and generating the second file encryption key based on the table master key for the target account table.

In Example 16, the subject matter of Examples 12-15 includes subject matter where the replication configurations further indicate the target account is located at a remote deployment of the database system, and the method further comprising: encoding the replicated file data at the target account using a second file encryption key, the second file encryption key based on a second root key associated with the remote deployment and the second private key of the user.

In Example 17, the subject matter of Example 16 includes, generating an account master key for the target account of the user at the remote deployment using the second root key and the second private key.

In Example 18, the subject matter of Example 17 includes, generating a table master key for a target account table storing the replicated file data at the remote deployment, the table master key based on the account master key for the target account; and generating the second file encryption key based on the table master key for the target account table.

In Example 19, the subject matter of Examples 11-18 includes, configuring the notification of the network intrusion event to include an instruction causing deletion of the first private key of the user, the first private key stored at a storage location of the user that is external to the database system.

In Example 20, the subject matter of Examples 11-19 includes, configuring the notification of the network intrusion event to include an instruction causing deletion of the source account of the user; and configuring the target account as a new source account of the user based on the deletion of the source account.

Example 21 is a computer-storage medium comprising instructions that, when executed by one or more processors of a machine, configure the machine to perform operations comprising: generating a file encryption key based on a first private key of a user and a root key associated with a primary deployment of a database system; encoding file data at a source account of the user, the source account configured at the primary deployment of the database system, and the encoding using the file encryption key; performing replication of the file data from the source account into a target account of the user to generate replicated file data; detecting a network intrusion event associated with the source account of the user; generating a notification of the network intrusion event for transmission to the user; and performing a failover of the source account to the target account of the user based on the notification, the failover granting the user access to the replicated file data based at least on a second private key of the user.

In Example 22, the subject matter of Example 21 includes, the operations further comprising: retrieving replication configurations from the source account of the user, the replication configurations identifying the target account and one or more data objects for replication, the one or more data objects including the file data; and performing the replication based on the replication configurations.

In Example 23, the subject matter of Example 22 includes subject matter where the replication configurations further indicate the target account is located at the primary deployment of the database system, and the operations further comprising: encoding the replicated file data at the target account using a second file encryption key, the second file encryption key based on the root key associated with the primary deployment and the second private key of the user.

In Example 24, the subject matter of Example 23 includes, the operations further comprising: generating an account master key for the target account of the user at the primary deployment using the root key and the second private key.

In Example 25, the subject matter of Example 24 includes, the operations further comprising: generating a table master key for a target account table storing the replicated file data at the primary deployment, the table master key based on the account master key for the target account; and generating the second file encryption key based on the table master key for the target account table.

In Example 26, the subject matter of Examples 22-25 includes subject matter where the replication configurations further indicate the target account is located at a remote deployment of the database system, and the operations further comprising: encoding the replicated file data at the target account using a second file encryption key, the second file encryption key based on a second root key associated with the remote deployment and the second private key of the user.

In Example 27, the subject matter of Example 26 includes, the operations further comprising: generating an account master key for the target account of the user at the remote deployment using the second root key and the second private key.

In Example 28, the subject matter of Example 27 includes, the operations further comprising: generating a table master key for a target account table storing the replicated file data at the remote deployment, the table master key based on the account master key for the target account; and generating the second file encryption key based on the table master key for the target account table.

In Example 29, the subject matter of Examples 21-28 includes, the operations further comprising: configuring the notification of the network intrusion event to include an instruction causing deletion of the first private key of the user, the first private key stored at a storage location of the user that is external to the database system.

In Example 30, the subject matter of Examples 21-29 includes, the operations further comprising: configuring the notification of the network intrusion event to include an instruction causing deletion of the source account of the user; and configuring the target account as a new source account of the user based on the deletion of the source account.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   generating a file encryption key based on a first private key of a user and a root key associated with a primary deployment of a database system;
   encoding file data at a source account of the user, the source account configured at the primary deployment of the database system, and the encoding using the file encryption key;
   performing replication of the file data from the source account into a target account of the user to generate replicated file data;
   detecting a network intrusion event associated with the source account of the user;
   generating a notification of the network intrusion event for transmission to the user; and
   performing a failover of the source account to the target account of the user based on the notification, the failover granting the user access to the replicated file data based at least on a second private key of the user.

2. The system of claim 1, the operations further comprising:
   retrieving replication configurations from the source account of the user, the replication configurations identifying the target account and one or more data objects for replication, the one or more data objects including the file data; and
   performing the replication based on the replication configurations.

3. The system of claim 2, wherein the replication configurations further indicate the target account is located at the primary deployment of the database system, and the operations further comprising:
   encoding the replicated file data at the target account using a second file encryption key, the second file encryption key based on the root key associated with the primary deployment and the second private key of the user.

4. The system of claim 3, the operations further comprising:
   generating an account master key for the target account of the user at the primary deployment using the root key and the second private key.

5. The system of claim 4, the operations further comprising:
generating a table master key for a target account table storing the replicated file data at the primary deployment, the table master key based on the account master key for the target account; and
generating the second file encryption key based on the table master key for the target account table.

6. The system of claim 2, wherein the replication configurations further indicate the target account is located at a remote deployment of the database system, and the operations further comprising:
encoding the replicated file data at the target account using a second file encryption key, the second file encryption key based on a second root key associated with the remote deployment and the second private key of the user.

7. The system of claim 6, the operations further comprising:
generating an account master key for the target account of the user at the remote deployment using the second root key and the second private key.

8. The system of claim 7, the operations further comprising:
generating a table master key for a target account table storing the replicated file data at the remote deployment, the table master key based on the account master key for the target account; and
generating the second file encryption key based on the table master key for the target account table.

9. The system of claim 1, the operations further comprising:
configuring the notification of the network intrusion event to include an instruction causing deletion of the first private key of the user, the first private key stored at a storage location of the user that is external to the database system.

10. The system of claim 1, the operations further comprising:
configuring the notification of the network intrusion event to include an instruction causing deletion of the source account of the user; and
configure the target account as a new source account of the user based on the deletion of the source account.

11. A method comprising:
generating, by at least one hardware processor, a file encryption key based on a first private key of a user and a root key associated with a primary deployment of a database system;
encoding file data at a source account of the user, the source account configured at the primary deployment of the database system, and the encoding using the file encryption key;
performing replication of the file data from the source account into a target account of the user to generate replicated file data;
detecting a network intrusion event associated with the source account of the user;
generating a notification of the network intrusion event for transmission to the user; and
performing a failover of the source account to the target account of the user based on the notification, the failover granting the user access to the replicated file data based at least on a second private key of the user.

12. The method of claim 11, further comprising:
retrieving replication configurations from the source account of the user, the replication configurations identifying the target account and one or more data objects for replication, the one or more data objects including the file data; and
performing the replication based on the replication configurations.

13. The method of claim 12, wherein the replication configurations further indicate the target account is located at the primary deployment of the database system, and the method further comprising:
encoding the replicated file data at the target account using a second file encryption key, the second file encryption key based on the root key associated with the primary deployment and the second private key of the user.

14. The method of claim 13, further comprising:
generating an account master key for the target account of the user at the primary deployment using the root key and the second private key.

15. The method of claim 14, further comprising:
generating a table master key for a target account table storing the replicated file data at the primary deployment, the table master key based on the account master key for the target account; and
generating the second file encryption key based on the table master key for the target account table.

16. The method of claim 12, wherein the replication configurations further indicate the target account is located at a remote deployment of the database system, and the method further comprising:
encoding the replicated file data at the target account using a second file encryption key, the second file encryption key based on a second root key associated with the remote deployment and the second private key of the user.

17. The method of claim 16, further comprising:
generating an account master key for the target account of the user at the remote deployment using the second root key and the second private key.

18. The method of claim 17, further comprising:
generating a table master key for a target account table storing the replicated file data at the remote deployment, the table master key based on the account master key for the target account; and
generating the second file encryption key based on the table master key for the target account table.

19. The method of claim 11, further comprising:
configuring the notification of the network intrusion event to include an instruction causing deletion of the first private key of the user, the first private key stored at a storage location of the user that is external to the database system.

20. The method of claim 11, further comprising:
configuring the notification of the network intrusion event to include an instruction causing deletion of the source account of the user; and
configure the target account as a new source account of the user based on the deletion of the source account.

21. A computer-storage medium comprising instructions that, when executed by one or more processors of a machine, configure the machine to perform operations comprising:
generating a file encryption key based on a first private key of a user and a root key associated with a primary deployment of a database system;
encoding file data at a source account of the user, the source account configured at the primary deployment of the database system, and the encoding using the file encryption key;

performing replication of the file data from the source account into a target account of the user to generate replicated file data;

detecting a network intrusion event associated with the source account of the user;

generating a notification of the network intrusion event for transmission to the user; and performing a failover of the source account to the target account of the user based on the notification, the failover granting the user access to the replicated file data based at least on a second private key of the user.

22. The computer-storage medium of claim 21, the operations further comprising:

retrieving replication configurations from the source account of the user, the replication configurations identifying the target account and one or more data objects for replication, the one or more data objects including the file data; and performing the replication based on the replication configurations.

23. The computer-storage medium of claim 22, wherein the replication configurations further indicate the target account is located at the primary deployment of the database system, and the operations further comprising:

encoding the replicated file data at the target account using a second file encryption key, the second file encryption key based on the root key associated with the primary deployment and the second private key of the user.

24. The computer-storage medium of claim 23, the operations further comprising:

generating an account master key for the target account of the user at the primary deployment using the root key and the second private key.

25. The computer-storage medium of claim 24, the operations further comprising:

generating a table master key for a target account table storing the replicated file data at the primary deployment, the table master key based on the account master key for the target account; and generating the second file encryption key based on the table master key for the target account table.

26. The computer-storage medium of claim 22, wherein the replication configurations further indicate the target account is located at a remote deployment of the database system, and the operations further comprising:

encoding the replicated file data at the target account using a second file encryption key, the second file encryption key based on a second root key associated with the remote deployment and the second private key of the user.

27. The computer-storage medium of claim 26, the operations further comprising:

generating an account master key for the target account of the user at the remote deployment using the second root key and the second private key.

28. The computer-storage medium of claim 27, the operations further comprising:

generating a table master key for a target account table storing the replicated file data at the remote deployment, the table master key based on the account master key for the target account; and generating the second file encryption key based on the table master key for the target account table.

29. The computer-storage medium of claim 21, the operations further comprising:

configuring the notification of the network intrusion event to include an instruction causing deletion of the first private key of the user, the first private key stored at a storage location of the user that is external to the database system.

30. The computer-storage medium of claim 21, the operations further comprising:

configuring the notification of the network intrusion event to include an instruction causing deletion of the source account of the user; and configure the target account as a new source account of the user based on the deletion of the source account.

* * * * *